United States Patent
Oshima et al.

(10) Patent No.: US 7,015,293 B2
(45) Date of Patent: Mar. 21, 2006

(54) CYCLOOLEFIN ADDITION COPOLYMER AND OPTICAL TRANSPARENT MATERIAL

(75) Inventors: Noboru Oshima, Tokyo (JP); Tatsuya Sakai, Tokyo (JP); Kenzo Ohkita, Tokyo (JP); Takashi Tsubouchi, Tokyo (JP)

(73) Assignee: JSR Corporation, Tokyo (JP)

( * ) Notice: Subject to any disclaimer, the term of this patent is extended or adjusted under 35 U.S.C. 154(b) by 4 days.

(21) Appl. No.: 10/515,189

(22) PCT Filed: May 14, 2003

(86) PCT No.: PCT/JP03/05996

§ 371 (c)(1),
(2), (4) Date: Mar. 23, 2005

(87) PCT Pub. No.: WO03/099887

PCT Pub. Date: Dec. 4, 2003

(65) Prior Publication Data

US 2005/0171310 A1    Aug. 4, 2005

(30) Foreign Application Priority Data

May 29, 2002    (JP) .............................. 2002-155548

(51) Int. Cl.
*C08F 232/08*    (2006.01)
(52) U.S. Cl. ...................... 526/281; 526/133; 526/171; 526/266; 526/279; 526/283; 524/553; 524/554; 525/338; 428/447; 428/523; 264/1.1
(58) Field of Classification Search ................ 526/281, 526/266, 279, 283, 133, 171; 525/338; 524/553, 524/554; 428/447, 523; 264/1.1
See application file for complete search history.

(56) References Cited

U.S. PATENT DOCUMENTS 3,925,333 A * 12/1975 Valvassori et al. ....... 525/331.8
5,202,388 A    4/1993 Iio et al.
5,468,819 A *  11/1995 Goodall et al. ............. 526/171
5,912,313 A *  6/1999 McIntosh et al. ........... 526/279
6,403,742 B1   6/2002 Oshima et al.
6,639,021 B1  10/2003 Oshima et al.
6,790,914 B1   9/2004 Kanamori et al.
2003/0119961 A1  6/2003 Oshima et al.
2004/0063873 A1  4/2004 Ohkita et al.

FOREIGN PATENT DOCUMENTS

| JP | 5-239148 | 9/1993 |
| JP | 10-158337 | 6/1998 |
| JP | 2002-20435 | 1/2002 |
| WO | 98-14499 | 4/1998 |

OTHER PUBLICATIONS

U.S. Appl. No. 10/515,189, filed Nov. 29, 2004, Oshima et al.
U.S. Appl. No. 10/969,065, filed Oct. 21, 2004, Oshima et al.

* cited by examiner

*Primary Examiner*—Fred Teskin
(74) *Attorney, Agent, or Firm*—Oblon, Spivak, McClelland, Maier & Neustadt, P.C.

(57) ABSTRACT

A cyclic olefin addition copolymer obtained by copolymerizing a cyclic olefin compound having a side chain substituent group with a ring structure, such as endo-tricyclo[4.3.0.1$^{2,5}$]deca-3,7-diene or endo-tricyclo[4.3.0.1$^{2,5}$]deca-3-ene, with another cyclic olefin compound such as bicyclo[2.2.1]hept-2-ene, and further with a cyclic olefin compound having a hydrolysable silyl group as needed, or hydrogenating after copolymerization; a composition for crosslinking in which a specific crosslinking agent is incorporated; a crosslinked product obtained by crosslinking the composition; an optical material containing the copolymer, the composition or the crosslinked product; and a method for producing the copolymer in which addition polymerization is conducted using a specific nickel catalyst.

18 Claims, 6 Drawing Sheets

CYCLOOLEFIN ADDITION COPOLYMER AND OPTICAL TRANSPARENT MATERIAL

CROSS REFERENCES TO RELATED APPLICATIONS

This application is a national stage application of International Patent Application No. PCT/JP03/05996, filed on May 14, 2003, and claims priority Japanese Patent Application No. 2002-155548, filed on May 29, 2002, both of which are incorporated herein by reference in their entireties.

1. Technical Field

The present invention relates to a cyclic olefin addition copolymer excellent in optical transparency, heat resistance and toughness, and suitable for optical material applications; a composition thereof; and an optical material using the same.

2. Background Art

In recent years, with demands for weight saving, miniaturization and an increase in density, substitution by optical transparent resins has progressed in the, fields of optical parts such as lenses, and liquid crystal display element parts such as backlights, light guiding plates and substrates, for which inorganic glass has hitherto been used. However, further improvements have been required for the optical transparent resin materials in characteristics such as heat resistance, low moisture absorption, adhesioness and stickiness and breaking strength, as well as optical transparency.

Many addition polymers of cyclic olefin compounds represented by bicyclo[2.2.1]hept-2-ene(norbornene) have hitherto been proposed as materials excellent in transparency and heat resistance (Japanese Patent Laid-Open Publication (Hei) 4-63807, Japanese Patent Laid-Open Publication (Hei) 8-198919, Published Japanese Translation (Hei) 9-508649 of PCT International Patent Application and Published Japanese Translation (Hei) 11-505880 of PCT International Patent Application.

However, the conventional norbornene addition polymers have a disadvantage similar to that of glass such as low toughness to cause fragility, when formed into a film, a sheet or the like, and are difficult to be handled.

Further, a polymer difficult to perform injection molding or extrusion molding because of it high glass transition temperature is formed into a film or a sheet by a solution cast method in many cases. In that case, although there is generally employed a method of dissolving the polymer in a solvent, applying or flow casting the solution onto a support, and evaporating the solvent in the polymer with gradual heating, the polymer is required to be homogeneously dissolvable in the solvent in the vicinity of room temperature in terms of that process. However, the norbornene addition polymer obtained by using a catalyst of zirconium, chromium, palladium or the like has no solubility in a hydrocarbon solvent or the like at room temperature, so that it is difficult to form the polymer into a film, a sheet, a thin membrane or the like by the solution cast method.

It is also possible to solubilize the copolymer in a hydrocarbon solvent such as cyclohexane, toluene or a mixture thereof at room temperature by formation of a copolymer in which a long chain alkyl group or a trialkoxysilyl group is introduced into a side chain of a cyclic olefin, and to improve toughness at the same time. However, on the other hand, the glass transition temperature decreases and the coefficient of linear expansion increases with an increase in the content thereof, resulting in the polymer having inferior heat resistance and dimensional stability (*J. Polymer Sci. Part B*, Vol. 37, 3003 (1999)).

Further, although many copolymers of a cyclic olefin compound and a non-cyclic olefin compound such as ethylene have been known, the glass transition temperature thereof decreases, and they are accompanied by an decrease in heat resistance (Japanese Patent Laid-Open Publication (Sho) 61-292601, U.S. Pat. No. 2,883,372 and *Makromol. Chem. Macromol. Symp.*, Vol. 47, 83 (1991)). Furthermore, as a means effective for the production of these copolymers, there has been known a catalyst system containing zirconium, titanium or vanadium, such as a metallocene. However, this catalyst scarcely exhibits polymerization ability for monomers containing a polar group, so that it is difficult to impart functions such as introduction of a crosslinking group such as a hydrolytic silyl group, and adhesioness.

On the other hand, tricyclo[$4.3.0.1^{2,5}$]deca-3,7-diene(dicyclopentadiene) addition (co)polymers having a cyclic side chain structure as a cyclic olefin, hydrogenated products thereof or tricyclo[$4.3.0.1^{2,5}$]deca-3-ene(dihydro-dicyclopentadiene) addition (co)polymers are known in *Polymer Letter*, Vol. 8, 573 (1970), *Polymer*, Vol. 10, 393 (1969), Japanese Patent Laid-Open Publication (Sho) 59-164316, U.S. Pat. No. 2,883,372, Published Japanese Translation 2000-509754 of PCT International Patent Application, Japanese Patent Laid-Open Publication (Hei) 3-45612, Japanese Patent Laid-Open Publication (Hei) 4-268312, Japanese Patent Laid-Open Publication (Sho) 61-292601, Japanese Patent Laid-Open Publication (Hei) 4-63807, Japanese Patent Laid-Open Publication (Hei) 5-239148, Japanese Patent Laid-Open Publication (Hei) 6-202091, Japanese Patent Laid-Open Publication 2001-19723, Japanese Patent Laid-Open Publication 2001-98035, *Organometallics, Vol.* 20, 2802–2812 (2001), *Polymer Science Ser. A*, Vol. 38, 255–260 (1996), *Macromol. Symp.*, Vol. 89, 433–442 (1995) and the like.

*Polymer Letter*, Vol. 8, 573 (1970) describes polymers having a number average molecular weight of 3, 500 or less, such as dicyclopentadiene and dihydrodicyclopentadiene obtained by using a cationic polymerizable catalyst. *Polymer*, Vol. 10, 393 (1969) describes that addition polymers having number average molecular weights of 1,950 and 860 are obtained by polymerizing dicyclopentadiene using a palladium catalyst.

Japanese Patent Laid-Open Publication (Sho) 59-164316 describes a copolymer obtained by using dihydrodicyclopentadiene and a norbornene-containing monomer. However, this is a petroleum hydrocarbon resin for adhesion and adhesive agents, which is obtained by use of a cationic polymerizable catalyst and has a molecular weight of 3,000 or less.

U.S. Pat. No. 2,883,372 describes an addition copolymer of ethylene and dihydrodicyclopentadiene. However, this is limited to a melt formable copolymer. Moreover, a monomer component is also limited, so that it is unable to impart a function such as crosslinking by introduction of a substituent group or the like.

Published Japanese Translation 2000-509754 of PCT International Patent Application describes a hydrogenated product of a copolymer of an α-olefin and dicyclopentadiene using a metallocene catalyst using one selected from titanium, zirconium and hafnium. However, the content of the α-olefin exceeds 50 mol % in this system, so that the hydrogenated copolymer thereof with ethylene has a glass transition temperature of lower than 200° C.

Further, in Japanese Patent Laid-Open Publication (Sho) 61-292601, Japanese Patent Laid-Open Publication (Hei) 3-45612, Japanese Patent Laid-Open Publication (Hei) 6-202091 and Japanese Patent Laid-Open Publication (Hei) 4-268312, addition (co)polymers using polycyclic monomers such as various norbornenes or tetracyclododecenes as monomers are claimed, and tricycloolefin compounds such as dicyclopentadiene and dihydrodicyclopentadiene are also contained therein. However, no example of actual polymerization using dihydrodicyclopentadiene is described, and properties thereof are not clarified. Further, all exemplified are copolymers with α-olefins such as ethylene, and the glass transition temperatures thereof are lower than 200° C. Furthermore, the polymers are obtained by using a catalyst system comprising a compound of a transition metal such as vanadium, zirconium, titanium, hafnium, vanadium, niobium or tantalum and an alkylalumoxane. However, these only exhibit extremely low polymerization ability to a polar group-containing monomer, so that it is difficult to impart a function by introduction of a polar group.

Japanese Patent Laid-Open Publication (Hei) 4-63807 discloses a production method using a norbornene polymer and a catalyst containing a nickel compound and an alkylalumoxane as main components, and norbornene homopolymers are mainly described in examples.

However, there is no example of using an addition (co) polymer containing repeating units derived from a tricycloolefin compound as particularly specified in the present invention, and the possibility that this addition (co)polymer shows specific physical properties is not described at all.

Japanese Patent Laid-Open Publication (Hei) 5-239148 describes addition (co)polymers using tricyclic norbornene monomers such as dicyclopentadiene and dihydrodicyclopentadiene as monomers, and hydrogenated products thereof. However, they are polymers polymerized by using a palladium complex catalyst.

Japanese Patent Laid-Open Publication 2001-19723 exemplifies an addition copolymer of a norbornene and cyclopentadiene using a catalyst containing a compound of a transition metal such as nickel or palladium. Further, Japanese Patent Laid-Open Publication 2001-98035 describes an addition copolymer of a norbornene and a monomer having an unsaturated bond outside a norbornene ring, such as dicyclopentadiene, using a palladium complex and a Lewis acid as a catalyst. However, both exemplify no hydrogenated product thereof, and are silent on the solubility in a hydrocarbon solvent.

*Polymer Science Ser. A*, Vol. 38, 255–260 (1996) describes that when exo-dicyclopentadiene is used, an addition polymer of cyclopentadiene using a nickel compound and a halogenated organic aluminum as a catalyst provides a high-molecular weight polymer, but when endo-dicyclopentadiene is used, it provides only a low-molecular weight polymer. However, no hydrogenated product is described also therein.

*Organometallics*, Vol. 20, 2802–2812 (2001) discloses a homopolymer of dicyclopentadiene using a palladium catalyst.

*Macromol. Symp.*, Vol. 89, 433–442 (1995) describes an addition polymer of exo-dihydrodicyclopentadiene using a palladium catalyst. This addition polymer is subjected to gel permeation chromatography (GPC) measurement in a chlorobenzene solvent, and the solubility in chlorobenzene is described. However, there is no description for the solubility in a hydrocarbon solvent such as toluene or cyclohexane.

A homopolymer of endo-dicyclopentadiene using a catalyst containing a palladium compound, a nickel compound, a chromium compound or the like is insoluble in a general hydrocarbon solvent at room temperature in almost all cases. Also for norbornene, a homopolymer obtained by using a catalyst of zirconium, chromium, palladium or the like is insoluble in many solvents at room temperature. This means that the polymers obtained by these methods are difficult to be not only melt formed, but also formed by the solution cast method.

In Published Japanese Translation (Hei) 9-508649 of PCT International Patent Application, it is presumed that the reason for the large difference in the solubility of a cyclic olefin addition polymer depending on the catalyst, particularly the transition metal species thereof, is caused by the difference in a microstructure when a cyclic olefin is addition polymerized. That is to say, it is described that although the addition polymerization of the cyclic olefin can form, for example, repeating units which are addition polymerized at the 2,7-positions, as well as ordinary repeating units which are addition polymerized at the 2,3-positions, a nickel catalyst provides relatively many repeating units formed by addition polymerization at the 2,7-positions compared to a palladium catalyst, resulting in an improvement in the solubility of the polymer in the hydrocarbon solvent.

Further, the addition (co)polymer obtained from dicyclopentadiene has unsaturated bonds in side chains, so that crosslinking reaction or discoloration to yellow occurs under high temperatures to cause poor heat deterioration resistance. Accordingly, the cyclic olefin polymer having unsaturated bonds in side chains is unfavorable.

Thus, there has never been known a cyclic olefin (co) polymer which dissolves in a hydrocarbon solvent at room temperature and can be formed into a film or a sheet by the solution cast method, and the film or sheet of which has toughness and are not impaired in the coefficient of linear expansion.

On the other hand, as related art making reference to a stereoisomer of a cyclic olefin, Japanese Patent Laid-Open Publication (Hei) 3-163114 (Japanese Patent No. 2,795,486) discloses a copolymer obtained from ethylene and a tetracyclododecene, and Japanese Patent No. 3,203,029 discloses a random cyclic olefin copolymer obtained from ethylene and an aromatic series-containing norbornene. Both copolymers are characterized in that the use of one having high exo-form content in a steric configuration of a substituent group of a norbornene structure improves heat resistance and mechanical strength.

As a result of intensive studies in view of the above-mentioned problems, the present inventors have discovered that a cyclic olefin addition copolymer obtained by addition polymerization of a monomer containing a specific tricycloolefin compound in which the ratio of the endo-form in stereoisomers is 80% or more, using a specific nickel catalyst, and further hydrogenation as needed, is soluble in any one of toluene, cyclohexane and a mixed solvent thereof at 25° C., also excellent in heat resistance and mechanical strength, and possible to introduce a crosslinkable group, and that the resulting crosslinked product is excellent in optical transparency and heat resistance, excellent in toughness and low in the coefficient of linear expansion, so that it is a material suitable for a sheet, a film and a thin membrane for optical material applications, thus leading to the completion of the present invention.

DISCLOSURE OF THE INVENTION

The present invention provides a cyclic olefin addition copolymer containing a specific structure described below, a crosslinkable composition, a crosslinked product thereof, an application of the copolymer (composition) and a method for producing the copolymer.

BEST MODE FOR CARRYING OUT THE INVENTION

Figure 1:
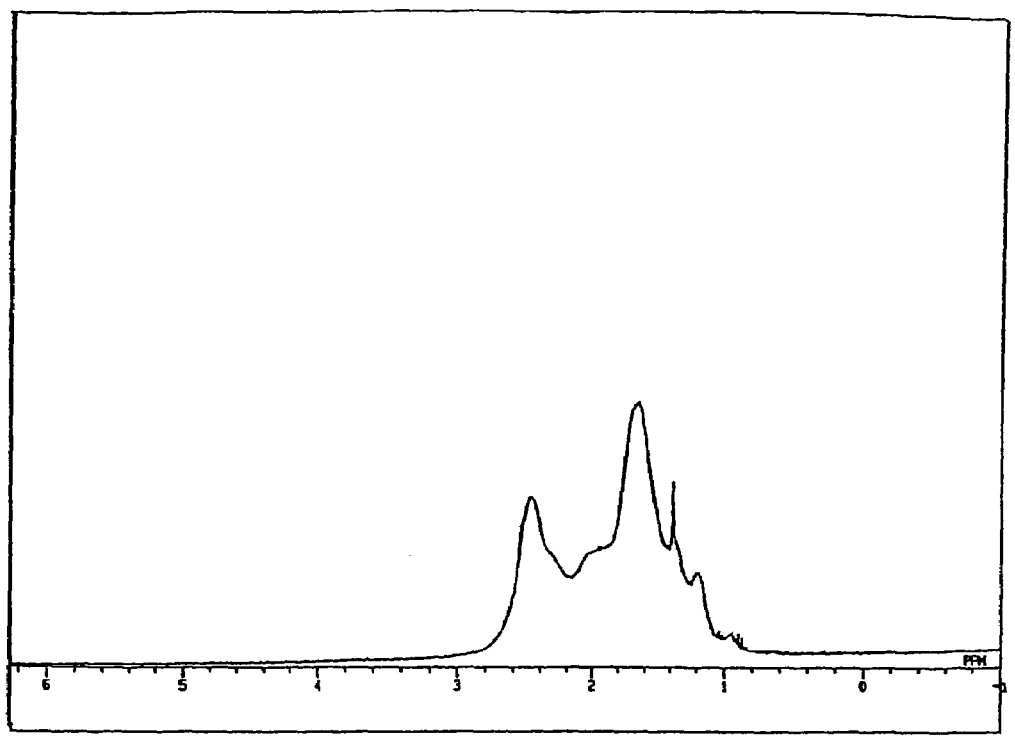
FIG. 1 is a $^1$H-NMR spectrum of a copolymer obtained in Example 1.

The present invention is described in detail below.

The cyclic olefin addition copolymer of the present invention is a cyclic olefin addition copolymer containing at least one repeating unit (a) selected from the following formulas (1-1) to (1-4) and a repeating unit (b) represented by the following general formula (2), and is obtained by addition polymerization of a tricycloolefin compound which forms the repeating unit (a) after addition polymerization, and in which the ratio of the endo-form (stereoisomer) is 80% or more, or further hydrogenating the resulting copolymer when an olefinic unsaturated bond exists therein:

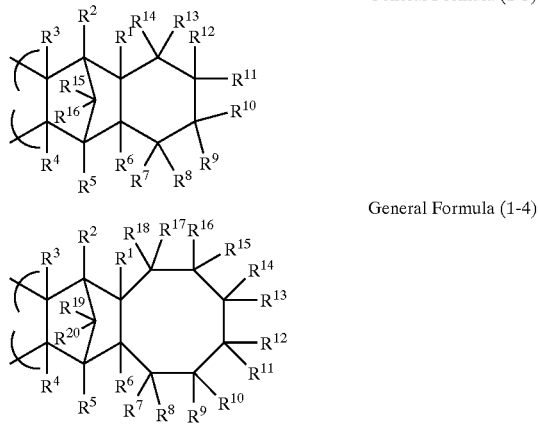

General Formula (1-3)

General Formula (1-4)

In formulas (1-1) to (1-4), $R^1$ to $R^{20}$ each independently represent a substituent group selected from a hydrogen atom, a halogen atom and a hydrocarbon or halogenated hydrocarbon group having 1 to 20 carbon atoms;

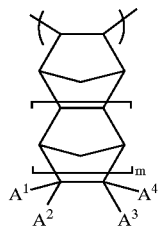

General Formula (2)

In formula (2), $A^1$ to $A^4$ each independently represent a hydrogen atom, a halogen atom or a hydrocarbon or halogenated hydrocarbon group having 1 to 20 carbon atoms, and m is 0 or 1.

The repeating unit (a) contained in the cyclic olefin addition copolymer of the present invention is formed by addition polymerization of a monomer (hereinafter correctively referred to as "specific monomer (a-1)") selected from tricycloolefin compounds represented by the following general formulas (7-1) to (7-4):

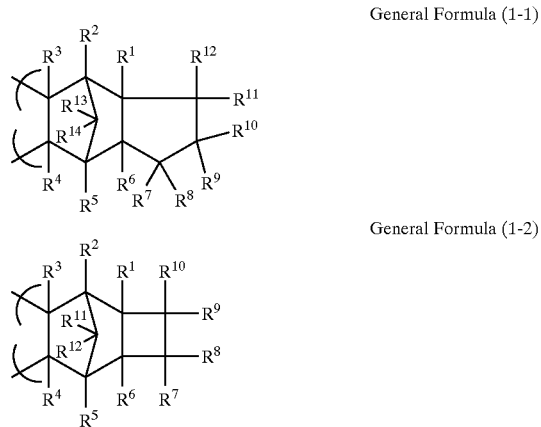

General Formula (1-1)

General Formula (1-2)

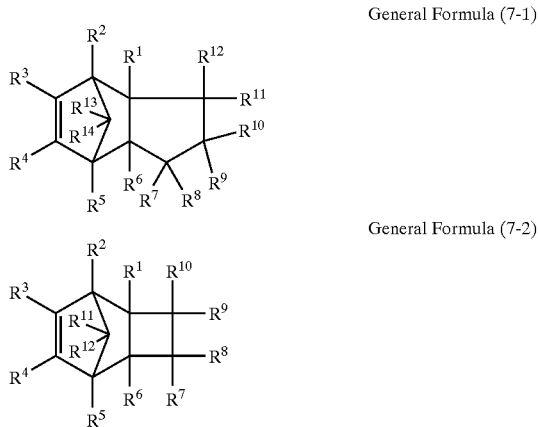

General Formula (7-1)

General Formula (7-2)

General Formula (7-3)

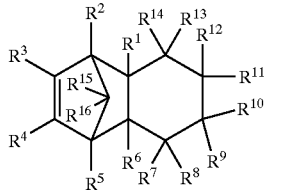

General Formula (7-4)

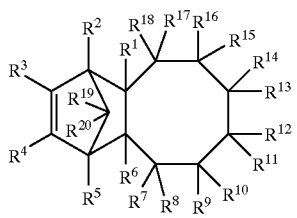

In formulas (7-1) to (7-4), $R^1$ to $R^{20}$ are the same as defined for formulas (1-1) to (1-4).

Further, the repeating unit (a) contained in the cyclic olefin addition copolymer of the present invention is also formed by addition polymerization of a monomer (hereinafter correctively referred to as "specific monomer (a-2)") selected from tricycloolefin compounds represented by the following general formulas (8-1) to (8-7), and then, hydrogenating the resulting polymer:

General Formula (8-1)

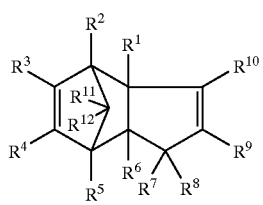

General Formula (8-2)

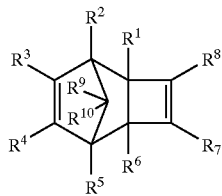

General Formula (8-3)

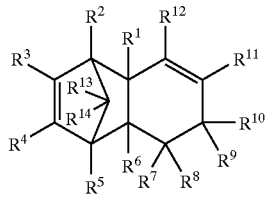

General Formula (8-4)

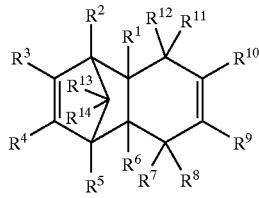

General Formula (8-5)

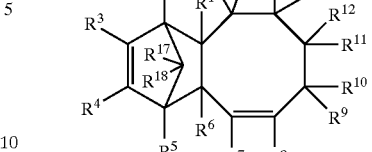

General Formula (8-6)

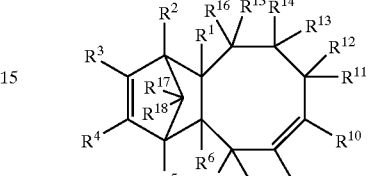

General Formula (8-7)

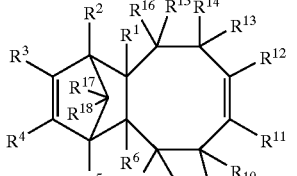

In formulas (8-1) to (8-7), $R^1$ to $R^{18}$ are the same as defined for formulas (1-1) to (1-4).

Specific examples of the above-mentioned specific monomers (a-1) include the following, but the present invention is not limited thereto.

Tricyclo[4.3.0.1$^{2,5}$]deca-3-ene,
1-methyltricyclo[4.3.0.1$^{2,5}$]deca-3-ene,
1-methoxytricyclo[4.3.0.1$^{2,5}$]deca-3-ene,
2-methyltricyclo[4.3.0.1$^{2,5}$]deca-3-ene,
5-methyltricyclo[4.3.0.1$^{2,5}$]deca-3-ene,
6-methyltricyclo[4.3 0.1$^{2,5}$]deca-3-ene,
6-ethyltricyclo[4.3.0.1$^{2,5}$]deca-3-ene,
9-methyltricyclo[4.3.0.1$^{2,5}$]deca-3-ene,
9-ethyltricyclo [4.3.0.1$^{2,5}$]deca-3-ene,
10-methyltricyclo[4.3.0.1$^{2,5}$]deca-3-ene,
10-ethyltricyclo[4.3.0.1$^{2,5}$]deca-3-ene,
10-phenyltricyclo[4.3.0.1$^{2,5}$]deca-3-ene,
10-cyclohexyltricyclo[4.3.0.1$^{2,5}$]deca-3-ene,
tricyclo [4.2.0.1$^{2,5}$]nona-3-ene,
2-methyltricyclo[4.2.0.1$^{2,5}$]nona-3-ene,
7-methyltricyclo[4.2.0.1$^{2,5}$]nona-3-ene,
tricyclo[4.4.0.1$^{2,5}$]undeca-3-ene,
1-methyltricyclo[4.4.0.1$^{2,5}$]undeca-3-ene,
2-methyltricyclo[4.4.0.1$^{2,5}$]undeca-3-ene,
2-ethyltricyclo[4.4.0.1$^{2,5}$]undeca-3-ene,
8-methyltricyclo[4.4.0.1$^{25}$]undeca-3-ene,
tricyclo[6.4.0.1$^{2,5}$]undeca-3-ene,
2-methyltricyclo[6.4.0.1$^{2,5}$]trideca-3-ene, and
8-methyltricyclo[6.4.0.1$^{2,5}$]trideca-3-ene.

Of these, tricyclo[4.3.0.1$^{2,5}$]deca-3-ene is preferably used in terms of ready availability as a raw material and a balance between the heat resistance and mechanical characteristics of the resulting copolymer.

They may be used either alone or in combination of two or more of them.

Specific examples of the above-mentioned specific monomers (a-2) include the following, but the present invention is not limited thereto.
Tricyclo[4.3.0.1$^{2,5}$]deca-3,7-diene,
1-methyltricyclo[4.3.0.1$^{2,5}$]deca-3,7-diene,
2-methyltricyclo[4.3.0.1$^{2,5}$]deca-3,7-diene,
2-ethyltricyclo[4.3.0.1$^{2,5}$]deca-3,7-diene,
5-methyltricyclo[4.3.0.1$^{2,5}$]deca-3,7-diene,
6-methyltricyclo[4.3.0.1$^{2,5}$]deca-3,7-diene,
6-ethyltricyclo[4.3.0.1$^{2,5}$]deca-3,7-diene,
10-methyltricyclo[4.3.0.1$^{2,5}$]deca-3,7-diene,
10-ethyltricyclo[4.3.0.1$^{2,5}$]deca-3,7-diene,
10-phenyltricyclo[4.3.0.1$^{2,5}$]deca-3,7-diene,
10-cyclohexyltricyclo[4.3.0.1$^{2,5}$]deca-3,7-diene,
tricyclo[4.4.0.1$^{2,5}$]undeca-3,7-diene,
1-methyltricyclo[4.4.0.1$^{2,5}$]undeca-3,7-diene,
2-methyltricyclo[4.4.0.1$^{2,5}$]undeca-3,7-diene,
2-ethyltricyclo[4.4.0.1$^{2,5}$]undeca-3,7-diene,
7-chlorotricyclo[4.4.0.1$^{2,5}$]undeca-3,7-diene,
7-fluorotricyclo[4.4.0.1$^{2,5}$]undeca-3,7-diene,
8-methyltricyclo[4.4.0.1$^{2,5}$]undeca-3,7-diene,
tricyclo[4.4.0.1$^{2,5}$]undeca-3,8-diene,
1-methyltricyclo[4.4.0.1$^{2,5}$]undeca-3,8-diene,
2-methyltricyclo[4.4.0.1$^{2,5}$]undeca-3,8-diene,
2-ethyltricyclo[4.4.0.1$^{2,5}$]undeca-3,8-diene,
8-methyltricyclo[4.4.0.1$^{2,5}$]undeca-3,8-diene,
tricyclo[6.4.0.1$^{2,5}$]trideca-3,11-diene,
2-methyltricyclo[6.4.0.1$^{2,5}$]trideca-3,11-diene,
8-methyltricyclo[6.4.0.1$^{2,5}$]trideca-3,11-diene,
tricyclo[6.4.0.1$^{2,5}$]trideca-3,10-diene,
2-methyltricyclo[6.4.0.1$^{2,5}$]trideca-3,10-diene,
8-methyltricyclo[6.4.0.1$^{2,5}$]trideca-3,10-diene,
tricyclo[6.4.0.1$^{2,5}$]trideca-3,9-diene,
2-methyltricyclo[6.4.0.1$^{2,5}$]trideca-3,9-diene, and
9-methyltricyclo[6.4.0.1$^{2,5}$]trideca-3,9-diene.

Of these, tricyclo[4.3.0.1$^{2,5}$]deca-3,7-diene is preferably used in terms of ready availability as a raw material and a balance between the heat resistance and mechanical characteristics of the resulting copolymer.

They may be used either alone or in combination of two or more of them.

When the addition copolymer of the present invention is obtained by using specific monomer (a-2), the addition copolymer is necessary to be hydrogenated after addition polymerization. The presence of an olefinic unsaturated bond in the copolymer is undesirable because the copolymer suffers oxidation by oxygen under high temperatures or deterioration by heat. In the addition copolymer, it is therefore required that 90 mol % or more, preferably 95 mol % or more, more preferably 99 mol % or more of the unsaturated bonds are hydrogenated.

Although the above-mentioned specific monomers (a-1) and (a-2) are available in the present invention, it is preferred to use the above-mentioned specific monomer (a-1) in that hydrogenation reaction is not indispensable. It is most preferred to use tricyclo[4.3.0.1$^{2,5}$]deca-3-ene among others.

In the above-mentioned specific monomers (a-1) and (a-2), the endo-form and the exo-form exist as stereoisomers. In the above-mentioned related art, it is described that the use of a tetracyclododecene and an aromatic series-containing norbornene having high exo-form content improves mechanical strength in the copolymer of ethylene and a cyclic olefin. However, in the present invention, surprisingly, it has been revealed that the monomer having higher endo-form content gives excellent characteristics of the resulting copolymer such as strength, particularly breaking strength and breaking elongation measured by a tensile test, and excellent toughness, quite contrary to the related art. That is to say, in the production of the copolymer of the present invention, it is necessary that the ratio of the endo-form in specific monomers (a-1) and/or (a-2) used is at least 80 mol % or more, and preferably 90 mol % or more. When this ratio is less than 80 mol %, no satisfactory performance is obtained in characteristics of the resulting copolymer such as breaking strength and breaking elongation, and toughness is deteriorated, resulting in fragility of a formed article such as a film or a sheet.

The repeating unit (b) contained in the cyclic olefin addition copolymer of the present invention is formed by addition polymerization of a monomer (hereinafter referred to as "specific monomer (b)") selected from cyclic olefin compounds represented by the following general formula (9):

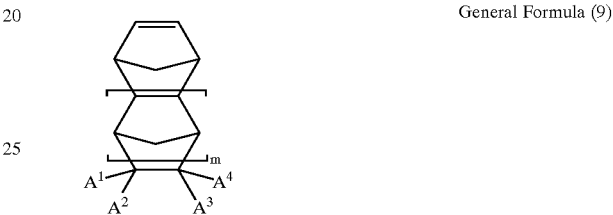

General Formula (9)

In formula (9), A$^1$ to A$^4$, and m are the same as defined for general formula (2).

As such specific monomers (b), for example, the following compounds are used either alone or in combination of two or more of them, but the present invention is not limited to these specific examples.
Bicyclo[2.2.1]hept-2-ene,
5-methylbicyclo[2.2.1]hept-2-ene,
5-ethylbicyclo[2.2.1]hept-2-ene,
5-propylbicyclo[2.2.1]hept-2-ene,
5-butylbicyclo[2.2.1]hept-2-ene,
5-hexylbicyclo[2.2.1]hept-2-ene,
5-decylbicyclo[2.2.1]hept-2-ene,
5-methyl-5-ethylbicyclo[2.2.1]hept-2-ene,
5-fluorobicyclo[2.2.1]hept-2-ene,
5-chlorobicyclo[2.2.1]hept-2-ene,
5,6-dimethylbicyclo[2.2.1]hept-2-ene,
5-phenylbicyclo[2.2.1]hept-2-ene,
5-cyclohexylbicyclo[2.2.1]hept-2-ene,
5-cyclooctylbicyclo[2.2.1]hept-2-ene,
5-indanylbicyclo [2.2.1]hept-2-ene,
tetracyclo[4.4.0.1$^{2,5}$.1$^{7,10}$]dodeca-3-ene,
8-methyltetracyclo[4.4.0.1$^{2,5}$.1$^{7,10}$]dodeca-3-ene, and
8-ethyltetracyclo[4.4.0.1$^{2,5}$.1$^{7,10}$]dodeca-3-ene.

Of these, bicyclo[2.2.1]hept-2-ene is preferred in that polymerization activity of addition polymerization is high, and in that the coefficient of linear expansion of the resulting cyclic olefin addition copolymer and a crosslinked product thereof decreases.

In the cyclic olefin addition copolymer of the present invention, the physical characteristics of the resulting copolymer, the solubility thereof in an organic solvent, and the like can be controlled by selecting the kind of repeating unit (b) and the ratio thereof contained. For example, the solubility in an organic solvent and the glass transition temperature can be controlled by optionally containing repeating units derived from an alkyl group-containing cyclic olefin such as 5-hexylbicyclo[2.2.1]hept-2-ene, and flexibility can be imparted to a formed article such as a film or a sheet. However, when the ratio thereof is too high, the problems of a decrease in heat resistance or mechanical strength and deterioration in the coefficient of linear expansion are encountered in some cases. The ratio of the repeating units (b) is from 10 to 90 mol %, preferably from 20 to 90 mol %, and more preferably from 30 to 70 mol %, in the whole repeating units. When the ratio thereof exceeds 90 mol %, breaking elongation decreases and toughness is deteriorated, resulting in brittleness and fragility of a formed article such as a film or a sheet. On the other hand, when it is less than 10 mol %, a problem of decrease arises with respect to the solubility in toluene, cyclohexane or a mixed solvent thereof at 25° C. in some cases.

Addition polymerization using specific monomer (b) mainly forms the repeating units (b). In that case, a repeating unit (d) represented by the following general formula (6) is also formed. For example, when m is 0 in general formula (2), the repeating unit (b) indicates a repeating unit polymerized by 2,3-addition, and the repeating unit (d) represented by the following general formula (6) indicates a repeating unit polymerized by 2,7-addition. Further, when m is 1 in general formula (2), the repeating unit (b) indicates a repeating unit polymerized by 3,4-addition, and the repeating unit (d) indicates a repeating unit polymerized by 3,11-addition.

General Formula (6)

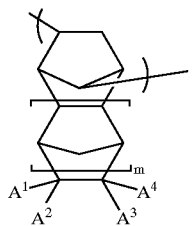

In formula (6), $A^1$ to $A^4$ and m are the same as defined for general formula (2).

Although it is difficult to determine the quantity of the repeating units (d) in the cyclic olefin addition copolymer of the present invention, the presence of the repeating units (d) formed by 2,7-addition or 3,11-addition can be confirmed by strong absorption observed in the region of CH absorption which appears at 45 to 55 ppm of a $^{13}$C-NMR spectrum (nuclear magnetic resonance spectrum).

Further, the cyclic olefin addition copolymer of the present invention can contain a repeating unit (c) represented by the following general formula (3), as well as the repeating unit (a) and the repeating unit (b):

General Formula (3)

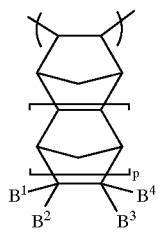

In formula (3), $B^1$ to $B^4$ each independently represent a hydrogen atom, a halogen atom, a hydrocarbon or halogenated hydrocarbon group having 1 to 20 carbon atoms, a hydrolysable silyl group or a polar group represented by —$(CH_2)_kX$, and at least one of $B^1$ to $B^4$ is a hydrolysable silyl group or a substituent group selected from polar groups represented by —$(CH_2)_kX$, wherein X is —$C(O)OR^{21}$ or —$OC(O)R^{22}$, $R^{21}$ and $R^{22}$ are a substituent group selected from hydrocarbon or halogenated hydrocarbon groups having 1 to 20 carbon atoms, and k is an integer of 0 to 3. Further, $B^1$ to $B^4$ may be a ring structure such as a hydrocarbon or heterocyclic ring formed from $B^1$ and $B^3$ or $B^2$ and $B^4$, or an alkylidenyl group formed from $B^1$ and $B^2$ or $B^3$ and $B^4$. p represents an integer of 0 to 2.

The repeating unit (c) is formed by addition polymerization of a monomer (hereinafter referred to as "specific monomer (c)") selected from cyclic olefin compounds represented by the following general formula (10):

General Formula (10)

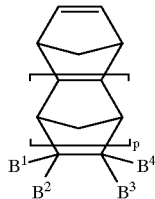

In formula (10), $B^1$ to $B^4$ and p are the same as defined for general formula (3).

As such specific monomers (c), for example, the following compounds are used either alone or in combination of two or more of them, but the present invention is not limited to these specific examples.

Examples of specific monomers (c) having a polar group represented by —$(CH_2)_kX$ include
methyl bicyclo[2.2.1]hept-5-ene-2-carboxylate,
ethyl bicyclo[2.2.1]hept-5-ene-2-carboxylate,
butyl bicyclo[2.2.1]hept-5-ene-2-carboxylate,
methyl 2-methylbicyclo[2.2.1]hept-5-ene-2carboxylate,
ethyl 2-methylbicyclo[2.2.1]hept-5-ene-2-carboxylate,
propyl 2-methylbicyclo[2.2.1]hept-5-ene-2carboxylate,
butyl 2-methylbicyclo[2.2.1]hept-5-ene-2-carboxylate,
trifluoroethyl 2-methylbicyclo[2.2.1]hept-5-ene-2-carboxylate,
ethyl 2-methylbicyclo[2.2.1]hept-5-ene-2-acetate,
2-methylbicyclo[2.2.1]hept-5-enyl acrylate,
2-methylbicyclo[2.2.1]hept-5-enyl methacrylate,
dimethyl bicyclo[2.2.1]hept-5-ene-2,3-dicarboxylate,
diethyl bicyclo[2.2.1]hept-5-ene-2,3-dicarboxylate,
8-methyl-8-methoxcarbonyltetracyclo[4.4.0.1$^{2,5}$.1$^{7,10}$] dodeca-3-ene, and
8-methyl-8-ethoxycarbonyltetracyclo[4.4.0.1$^{2,5}$.1$^{7,10}$] dodeca-3-ene.

Further, as the hydrolysable silyl group, one represented by general formula (4) or general formula (5) is desirably used.

General Formula (4)

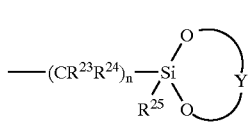

General Formula (5)

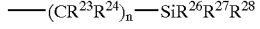

In formula (4) and formula (5), $R^{23}$, $R^{24}$ and $R^{25}$ each independently represent a hydrogen atom or a substituent group selected from an alkyl group having 1 to 20 carbon atoms, a cycloalkyl group and an aryl group, $R^{26}$, $R^{27}$ and $R^{28}$ each independently are a hydrogen atom or a substituent group selected from an alkyl group having 1 to 20 carbon atoms, a cycloalkyl group, an aryl group, an alkoxyl group, an allyloxy group and a halogen atom, at least one of $R^{26}$, $R^{27}$ and $R^{28}$ is a substituent group selected from an alkoxyl group, an allyloxy group and a halogen atom, and n represents an integer of 0 to 5. Further, Y represents a hydrocarbon residue of an aliphatic diol having 2 to 20 carbon atoms, an alicyclic diol or an aromatic diol.

Examples of specific monomers (c) having the hydrolysable silyl group represented by general formula (4) include
5-[1'-methyl-2',5'-dioxa-1'-silacyclopentyl]bicyclo[2.2.1]hept-2-ene,
5-[1'-methyl-3',3',4',4'-tetraphenyl-2',5'-dioxa-1'-silacyclopentyl]bicyclo[2.2.1]hept-2-ene,
5-[1',3',3',4',4'-pentamethyl-2',5'-dioxa-1'-silacyclopentyl]bicyclo[2.2.1]hept-2-ene,
5-[1'-phenyl-2',5'-dioxa-1'silacyclopentyl]bicyclo[2.2.1]hept-2-ene,
5-[1'-ethyl-2',5'-dioxa-1'silacyclopentyl]bicyclo[2.2.1]hept-2-ene,
5-[1',3'-dimethyl-2',5'-dioxa-1'silacyclopentyl]bicyclo[2.2.1]hept-2-ene,
5-[1',3',4'-trimethyl-2',5'-dioxa-1'-silacyclopentyl]bicyclo[2.2.1]hept-2-ene,
5-[1'-methyl-2',6'-dioxa-1'-silacyclohexyl]bicyclo[2.2.1]hept-2-ene,
5-[1'-ethyl-2',6'-dioxa-1'-silacyclohexyl]bicyclo[2.2.1]hept-2-ene,
5-[1',3'-dimethyl-2',6'-dioxa-1'-silacyclohexyl]bicyclo[2.2.1]hept-2-ene,
5-[1',4',4'-trimethyl-2',6'-dioxa-1'-silacyclohexyl]bicyclo[2.2.1]hept-2-ene,
5-[1',4',4'-trimethyl-2',6'-dioxa-1'-silacyclohexyl]-methylbicyclo[2.2.1]hept-2-ene,
5-[1',4',4'-trimethyl-2',6'-dioxa-1'-silacyclohexyl]-ethylbicyclo[2.2.1]hept-2-ene,
5-[1'-phenyl-4',4'-dimethyl-2',6'-dioxa-1'-silacyclohexyl]bicyclo[2.2.1]hept-2-ene,
5-[1'-methyl-4'-phenyl-2',6'-dioxa-1'-silacyclohexyl]bicyclo[2.2.1]hept-2-ene,
5-[3'-methyl-2',4'-dioxa-3'-silaspiro[5.5]undecyl]bicyclo[2.2.1]hept-2-ene,
5-[1'-methyl-4-ethyl-4'-butyl-2',6'-dioxa-1'-silacyclohexyl]bicyclo[2.2.1]hept-2-ene,
5-[1'-methyl-3',3'-dimethyl-5'-methylene-2',6'-dioxa-1'-silacyclohexyl]bicyclo[2.2.1]hept-2-ene,
5-[1'-phenyl-2',6'-dioxa-1'-silacyclohexyl]bicyclo[2.2.1]hept-2-ene,
5-[1'-methyl-3'-phenyl-2',6'-dioxa-1'-silacyclohexyl]bicyclo[2.2.1]hept-2-ene,
5-[1',4',4'-trimethyl-2',6'-dioxa-1'-silacyclohexyl]-7-oxabicyclo[2.2.1]hept-2-ene,
5-[1'-methyl-2',6'-dioxa-1'-silacyclohexyl]-7-oxa-bicyclo[2.2.1]hept-2-ene,
5-[1'-methyl-2',7'-dioxa-1'-silacycloheptyl]bicyclo[2.2.1]hept-2-ene,
8-[1',4',4'-trimethyl-2',6'-dioxa-1'-silacyclohexyl]tetracyclo[4.4.0.1$^{2,5}$.1$^{7,10}$]dodeca-3-ene,
8-[1'-methyl-2',6'-dioxa-1'-silacyclohexyl]tetracyclo[4.4.0.1$^{2,5}$.1$^{7,10}$]dodeca-3-ene, and the like.

Further, examples of specific monomers (c) having the hydrolysable silyl group represented by general formula (5) include
5-triethoxysilylbicyclo[2.2.1]hept-2-ene,
5-methyldiethoxysilylbicyclo[2.2.1]hept-2-ene,
5-methyldimethoxysilylbicyclo[2.2.1]hept-2-ene,
5-dimethylchlorosilylbicyclo[2.2.1]hept-2-ene,
5-methyldiethoxysilylbicyclo[2.2.1]hept-2-ene,
5-methyldichlorosilylbicyclo[2.2.1]hept-2-ene,
5-tripropoxysilylbicyclo[2.2.1]hept-2-ene,
8-triethoxysilyltetracyclo[4.4.0.1$^{2,5}$.1$^{7,10}$]dodeca-3-ene, and the like.

When the content of the repeating units (c) having a polar group such as a hydrolysable silyl group or an ester group is increased herein, adhesion or adhesiveness with other materials can be further improved, and the cyclic olefin addition copolymer of the present invention can be converted to a crosslinked product by using a crosslinking agent described later. However, on the other hand, an increase in the content of the repeating units (c) having the polar group causes an increase in water absorption properties and dielectric constant. Accordingly, the ratio of the repeating units (c) represented by formula (3) in the cyclic olefin addition copolymer is 30 mol % or less, preferably from 0.1 to 10 mol %, and more preferably from 1 to 5 mol %, in the whole repeating units.

The repeating unit (c) having the hydrolysable silyl group represented by the above-mentioned general formula (5) is excellent in reactivity compared to the case having the silyl group represented by the above-mentioned general formula (4). Conversely, the repeating unit (c) having the hydrolysable silyl group represented by the above-mentioned general formula (4) is more excellent in hydrolysis resistance, so that a solution of the cyclic olefin copolymer comes to have excellent storage stability.

Further, addition polymerization is conducted using specific monomer (c) having an acryloyl group or a methacryloyl group, and such an acryloyl group or methacryloyl group can also be utilized as a crosslinking point. However, in this case, it is necessary to be designed so that the resulting copolymer is difficult to suffer oxidation by oxygen or deterioration by heat even when hydrogenation thereof is not carried out, such that specific monomer (a-1) is used as a monomer for giving the repeating unit (a).

The cyclic olefin addition copolymer of the present invention can further contain a repeating unit (e) obtained by addition polymerization of a "specific α-olefin compound".

Specific examples of such specific α-olefin compounds include ethylene, propylene, 1-butene, 2-methylpropene (isobutene), trimethylvinylsilane, triethylvinylsilane, styrene, 4-methylstyrene, 2-methylstyrene, 4-ethylstyrene and the like. They can be used either alone or as a combination of two or more of them.

The glass transition temperature of the cyclic olefin addition copolymer of the present invention can be controlled by introducing the "specific α-olefin compound"-derived repeating units (e) into the copolymer. The ratio of the repeating units (e) in the cyclic olefin addition copolymer is from 0 to 40 mol %, and preferably from 0 to 20 mol % (with the provisothat the repeating unit (a)+(b)+(c)+(e)=100 mol %). When the ratio of the repeating units (e) exceeds 40 mol %, the glass transition temperature of the cyclic olefin addition copolymer of the present invention is lowered to deteriorate heat resistance.

The glass transition temperature of the cyclic olefin addition copolymer of the present invention is determined from the peak temperature of temperature dispersion of tan δ measured by dynamic viscoelasticity (storage modulus: E', loss modulus: E'', tan δ=E''/E').

The glass transition temperature of the cyclic olefin addition copolymer of the present invention measured as described above is usually from 150 to 450° C., and preferably from 200 to 400° C. When the glass transition temperature is lower than 150° C., the possibility increases that the problem of thermal deformation or the like is encountered in the case that a formed article containing the cyclic olefin addition copolymer of the present invention is processed or used. On the other hand, when it exceeds 450° C., the polymer becomes inflexible, and when the polymer is formed into a film or a sheet, the coefficient of linear expansion decreases, but the film or the sheet become fragile and lose toughness. The glass transition temperature of the cyclic olefin addition copolymer in the present invention can be controlled by the selection of the substituent groups in the repeating units (b) and (c) and/or the introduction of the repeating unit (e), for example, such as the introduction of a straight chain alkyl substituent group. having 4 to 20 carbon atoms into the repeating unit (c).

As for the molecular weight of the cyclic olefin addition copolymer in the present invention, the polystyrene-converted number average molecular weight (Mn) measured by gel permeation chromatography using o-dichlorobenzene as a solvent at 120° C. is from 30,000 to 500,000, and the weight average molecular weight (Mw) is from 50,000 to 1,000,000. Preferably, it is desirable that the number average molecular weight is from 50,000 to 200,000 and the weight average molecular weight is from 100,000 to 500,000.

When the number average molecular weight is less than 30,000 and the weight average molecular weight is less than 50,000, a film, a thin membrane and a sheet formed are insufficient in breaking strength and elongation to become fragile in many cases. On the other hand, when the number average molecular weight exceeds 500,000 and the weight average molecular weight exceeds 1,000,000, the solution viscosity increases in forming a cast film to cause poor storage stability of a solution, resulting in the difficulty of handling in some cases.

The coefficient of linear expansion of the cyclic olefin addition copolymer of the present invention is 70 ppm/° C. or less, and preferably 60 ppm/° C. or less. The coefficient of linear expansion in the cyclic olefin addition copolymer of the present invention varies depending on the selection of a substituent group on the repeating unit (b) or the repeating unit (c) and the ratio of the respective repeating units contained in the polymer. Exceeding 70 ppm/° C. is undesirable because the problem of deformation associated with changes in dimension arises in the use environment with a large temperature variation in some cases.

The cyclic olefin addition copolymer of the present invention is produced by indispensably requiring specific monomers (a-1) and/or (a-2) and specific monomer (b), and further addition copolymerizing specific monomer (c) and/or the specific α-olefin compound used as needed, using a nickel compound as a catalyst component. Production methods thereof are described below.

As the polymerization catalyst, there is used (A) a multicomponent catalyst containing components represented by the following 1) to 3):
  1) a nickel compound,
  2) a compound selected from a superacid, a Lewis acid and an ionic boron compound, and
  3) an organic aluminum compound, or (B) a nickel complex having at least one nickel-carbon sigma bond and a superacid anion as a counter anion. However, the multicomponent catalyst of (A) is preferred because it requires no complicated synthetic process.

(A): The multicomponent catalyst is composed of components containing 1), 2) and 3) shown below.
1) Nickel Compound: at Least One Compound Selected from the Group of Compounds Given Below A compound selected from an organic carboxylate, organic phosphite, organic phosphate, organic sulfonate, β-diketone compound and the like of nickel. For example, nickel acetate, nickel octanoate, nickel 2-ethylhexanoate, nickel naphthenate, nickel oleate, nickel versatate, nickel dibutylphosphite, nickel dibutylphosphate, nickel dioctylphosphate, a nickel salt of dibutyl phosphate ester, nickel dodecylbenzenesulfonate, nickel p-toluenesulfonate, bis(acetylacetonato)nickel, nickel bis(ethylacetoacetate) and the like.

A compound obtained by modifying the above-mentioned organic carboxylate of nickel with a superacid such as hexafluoroantimonic acid, tetrafluoroboric acid, trifluoroacetic acid or hexafluoroacetone.

A diene or triene coordinate complex of nickel, for example, a nickel complex such as
dichloro(1,5-cyclooctadiene)nickel,
[(η³-crotyl)(1,5-cyclooctadiene)nickel]hexafluorophosphate and tetrafluoroborate thereof,
a tetrakis[3,5-bis(trifluoromethyl)]borate complex,
(1,5,9-cyclododecatriene)nickel,
bis[norbornadiene]nickel, or
bis(1,5-cyclooctadiene)nickel.

A complex in which a ligand having an atom such as P, N or O is coordinated to nickel, for example, a nickel complex such as
bis(triphenylphosphine)nickel dichlorides
bis(triphenylphosphine)nickel dibromide,
bis[tri(2-methylphenyl)phosphine)nickel dichloride,
bis[tri(4-methylphenyl)phosphine)nickel dichloride,
bis[N-(3-t-butylsalicylidene)phenylaminato]nickel,
Ni[PhC(O)CH](Ph),
Ni(OC(C₆H₄)PPh)(H)(Pcy₃),
Ni[OC(O)(C₆H₄)P](H)(PPh₃),
a reaction product of bis(1,5-cyclooctadiene)nickel and PhC(O)CH=PPh₃, or
[2,6-(I—Pr)₂C₆H₃N=CHC₆H₃(O)(Anth)](Ph)(PPh₃)Ni (wherein Anth: 9-anthracenyl, Ph: phenyl, Cy: cyclohexyl).

2) Compound Selected from Superacid, Lewis Acid and Ionic Boron Compound

The superacids include, for example, hexafluoroantimonic acid, hexafluorophosphoric acid, hexafluoroarsenic acid, trifluoroacetic acid, fluorosulfuric acid, trifluoromethanesulfonic acid, tetrafluoroboric acid, tetrakis(pentafluorophenyl)boric acid, tetrakis[3,5-bis(trifluoromethyl)phenyl]boric acid, p-toluenesulfonic acid, pentafluoropropionic acid and the like.

The Lewis acid compounds include, for example, boron compounds such as a complex of boron trifluoride with an ether, an amine, a phenol or the like, a complex of an aluminum trifluoride with an ether, an amine, a phenol or the like, tris(pentafluorophenyl)borane and tris[3,5-bis(trifluoromethyl)phenyl]borane, aluminum compounds such as aluminum trichloride, aluminum tribromide, ethylaluminum dichloride, ethylaluminum sesquichloride, diethylaluminum fluoride and tri(pentafluorophenyl)aluminum, organic halogen compounds showing Lewis acidity such as hexafluoroacetone, hexachloroacetone, chloranil and hexafluoromethyl ethyl ketone, and other compounds showing Lewis acidity such as titanium trichloride and pentafluoroantimony, and the like.

The ionic boron compounds include, for example, triphenylcarbenium tetrakis(pentafluorophenyl)borate, triphenylcarbenium tetrakis[3,5-bis(trifluoromethyl)phenyl]borate, triphenylcarbenium tetrakis(2,4,6-trifluorophenyl)borate, triphenylcarbenium tetraphenylborate, tributylammonium tetrakis(pentafluorophenyl)borate, N,N-dimethylanilinium tetrakis(pentafluorophenyl)borate, N,N-diethylanilinium tetrakis(pentafluorophenyl)borate, N,N-diphenylanilinium tetrakis(pentafluorophenyl)borate and the like.

3) Organic Aluminum Compound

There is suitably used, for example, an alkylalumoxane compound such as methylalumoxane, ethylalumoxane or butylalumoxane, an alkylaluminum compound and an alkylaluminum halide compound such as trimethylaluminum, triethylaluminum, triisobutylaluminum, diisobutylaluminum hydride, diethylaluminum chloride, diethylaluminum fluoride, ethylaluminum sesquichloride or ethylaluminum dichloride, a mixture of the above-mentioned alkylalumoxane compound and the above-mentioned alkylaluminum compound, or the like. In particular, methylalumoxane or an organic aluminum component containing methylalumoxane is most preferred because of its slight decrease in polymerization activity when polar groupcontaining specific monomer (c) is used.

(B) The nickel complex having at least one nickel-carbon sigma bond and a superacid anion as a counter anion is represented by the following general formula (11):

$$[L^1L^2ML^3]^+[An]^-  \qquad (11)$$

In formula (11), M represents a nickel atom. $L^1$, $L^2$ and $L^3$ represent a ligand of M, a carbon atom of at least one ligand binds to a nickel atom by a a σ bond, and the others represent a compound selected from a cycloalkadiene having 6 to 12 carbon atoms, norbornadiene, a cycloalkatriene having 10 to 20 carbon atoms and an aromatic compound having 6 to 20 carbon atoms. Further, $[An]^{31}$ represents a superacid-derived non-coordinate or weak coordinate counter anion. The counter anion $[An]^{31}$ is preferably $BF_4^-$, $PF_6^-$, $SbF_5SO_3F^-$, $AlF_3SO_3CF_3^-$, $AsF_6^-$, $SbF_6^-$, $CF_3CO_2^-$, $C_2F_5CO_2^-$, $CH_3C_6H_4SO_3^-$, $B[C_6F_5]_4^-$ or $B[3,5-(CF_3)_2C_6H_3]_4^-$.

Specific examples of the compounds represented by the above-mentioned general formula (11) include but are not limited to
[η³-crotyl)Ni(cycloocta-1,5-diene)][B(3,5-(CF$_3$)$_2$C$_6$F$_3$)$_4$],
[η³-crotyl)Ni(cycloocta-1,5-diene)][PF$_6$],
[η³-allyl)Ni(cycloocta-1,5-diene)][B(C$_6$F$_5$)$_4$], and
[η³-crotyl)Ni(cycloocta-1,5-diene)][SbF$_6$], and the like.

These catalyst components are used in amounts within the following ranges.

The nickel compound is from 0.02 to 100 mmol atom per mol of monomer, the organic aluminum compound is from 1 to 5,000 mol per mol atom of nickel, and the superacid is from 0.2 to 5.0 mol per mol atom of nickel. The Lewis acid is from 0 to 50 mol per mol atom of nickel. Alternatively, the nickel compound is from 0.02 to 100 mmol atom per mol of monomer, the organic aluminum compound is from 1 to 5,000 mol pre mol atom of nickel, and the ionic boron compound is from 0.2 to 5.0 mol per mol atom of nickel.

When the nickel compound modified with the superacid is used as 1) the nickel compound in (A) the multicomponent catalyst of the present invention, the Lewis acid is not necessarily required. However, addition of the Lewis acid more improves polymerization activity. Further, when the chlorine-containing organic aluminum halide compound is used as the organic aluminum component, addition of the Lewis acid is not necessarily required.

Further, as the catalyst component of the present invention, addition of one or two or more kinds of compounds selected from the superacid, the Lewis acid and the ionic boron compound is necessary in (A) the multicomponent catalyst, and the non-coordinate or weak coordinate counter ion derived from the superacid is necessary in (B) the single component catalyst. By using these catalysts, the repeating unit (d) derived from specific monomer (b) and formed by addition polymerization at the 2,7-positions or the 3,11-positions is observed in the copolymer of the present invention, and the copolymer is improved in solubility in toluene, cyclohexane or a mixed solvent thereof at 25° C.

The cyclic olefin addition copolymer of the present invention can be obtained by polymerization in one or two or more kinds of solvents selected from an alicyclic hydrocarbon solvent such as cyclohexane, cyclopentane or methylcyclopentane, an aliphatic hydrocarbon solvent such as hexane, heptane or octane, an aromatic hydrocarbon solvent such as toluene, benzene, xylene or mesitylene, a halogenated hydrocarbon solvent such as chloromethane, dichloromethane, 1,2-dichloroethane, 1,1-dichloroethane, tetrachloroethane, chloroform, carbon tetrachloride, chlorocyclopentane, chlorocyclohexane, chlorobenzene or dichlorobenzene, and the like, using (A) the above-mentioned multicomponent catalyst or (B) the above-mentioned single component catalyst. Of these, toluene, cyclohexane, dichloromethane or a mixed solvent thereof is desirably used from the viewpoints of general-purpose properties and the like.

As a polymerization method, a reaction vessel is charged with thesolvent, specificmonomers (a) and (b), andspecific-monomer (c) as needed, further the specific α-olefin compound as needed, and a molecular weight modifier as needed, in a nitrogen or argon atmosphere, and the polymerization system is set to a temperature ranging from −20° C. to 100° C. Then, the above-mentioned catalyst component is added, and polymerization is conducted at a temperature ranging from −20° C. to 100° C. The weight ratio of solvents to monomers is from 1 to 20. The molecular weight of the copolymer is adjusted by the amount of the polymerization catalyst, the amount of the molecular weight modifier added, the conversion rate to the polymer and the polymerization temperature. As the molecular weight modifier, there is used an α-olefin such as 1-hexene or 1-octene, an aromatic vinyl compound such as styrene, 3-methylstyrene, 4-methylstyrene, 4-ethylstyrene, 3,5-di-methylstyrene, 1-vinylnaphthalene or divinylbenzene, a cyclic unconjugated diene such as cyclooctadiene or cyclododecatriene, diphenyldihydrosilane, hydrogen or the like, and preferably used is the aromatic vinyl compound.

The termination of the polymerization is conducted by a compound selected from water, an alcohol, an organic acid, carbon dioxide and the like. Separation and removal of a catalyst residue may be appropriately conducted by known methods. For example, there is a method of adding a mixture of an alcohol and an aqueous solution of an organic acid selected from maleic acid, fumaric acid, oxalic acid, malic acid and the like to a polymer solution to separate it from an aqueous layer. Further, the catalyst residue may be removed by adsorption removal using an adsorbent such as diatomaceous earth, alumina or silica, or by filtration separation using a filter or the like.

The polymer is obtained by pouring the polymer solution into an alcohol selected from methanol, ethanol, isopropanol and the like to coagulate it, and drying it under reduced pressure. In this step, unreacted monomers remaining in the polymer solution are also removed.

The olefinic unsaturated bond-containing addition copolymer obtained by polymerization using the monomer containing one or more kinds of specific monomers (a-2) described above is hydrogenated using the following catalyst and conditions.

As the hydrogenation catalyst, there is suitably used one selected from a heterogeneous catalyst in which nickel, rhodium, palladium, platinum or the like is carried on a solid such as silica, diatomaceous earth, alumina or activated carbon, a homogeneous catalyst in which a compound of titanium, nickel, palladium, cobalt or the like is combined with an organic metal compound, a catalyst comprising a complex of ruthenium, osmium, rhodium, iridium or the like, and the like. As a solvent, there is used an aromatic hydrocarbon such as toluene, xylene, ethylbenzene or tetralin, or an alicyclic hydrocarbon such as cyclohexane, methylpentane, methylcyclohexane or decalin, and an aliphatic hydrocarbon such as hexane or heptane, an ether such as tetrahydrofuran, dimethoxyethane or butyl ether, or the like as needed. For the conditions, the hydrogen pressure and the temperature are appropriately-selected within the ranges of 0.5 to 15 MPa and 20 to 200° C., respectively.

The hydrogenated copolymer is treated in a manner similar to that of the after treatment of the polymerization. A catalyst residue is removed using an organic acid or an absorbent, and coagulation is conducted using steam or an alcohol, followed by separation and drying to recover the polymer.

The cyclic olefin addition copolymer of the present invention can also be blended with a hydrogenated product of a known cyclic olefin ring-opened (co)polymer or an addition copolymer of a cyclic olefin with ethylene to form a polymer blend composition. The formation of the polymer blend composition can control the glass transition temperature of the cyclic olefin addition copolymer of the present invention without impairing the toughness thereof, and makes possible the adjustment and modification of optical characteristics of a formed article such as a film or a sheet by heat treatment, injection molding, compression molding and the like. Further, the cyclic olefin addition copolymer of the present invention can be blended with a petroleum resin having an alicyclic hydrocarbon structure, a hydrogenated styrenic resin or the like, thereby being able to control softening temperature, birefringence or the like while retaining transparency.

In such a composition, for the compounding ratio of the cyclic olefin addition copolymer of the present invention to the above-mentioned hydrogenated ring-opened (co) polymer, the ratio of the cyclic olefin addition copolymer of the present invention in the cyclic olefin addition copolymer in the composition is from 10 to 90% by weight, preferably from 20 to 80% by weight, and more preferably from 30 to 70% by weight.

To the cyclic olefin addition copolymer of the present invention, there can be added, for example, a phenolic or hydroquinone antioxidant such as
2,6-di-t-butyl-4-methylphenol
4,4'-thiobis-(6-t-butyl-3-methylphenol)
1,1'-bis(4-hydroxyphenyl)cyclohexane,
2,2'-methylenebis(4-ethyl-6-t-butylphenol),
2,5-di-t-butylhydroquinone, or
pentaerythrityltetrakis[3-(3,5-di-t-butyl-4-hydroxyphenyl) propionate].

Further, it is possible to blend a phosphorus antioxidant such as
tris(4-methoxy-3,5-diphenyl)phosphite,
tris(nonylphenyl)phosphite,
tris(2,4-di-t-butylphenyl)phosphite
bis(2,6-di-t-butyl-4-methylphenyl)pentaerythritol diphosphite, or
bis(2,4-di-t-butylphenyl)pentaerythritol diphosphite, thereby being able to improve oxidation stability.

Of these compounds, a compound having a decomposition temperature (a 5% decrease in weight) of 250° C. or higher is preferred.

When these antioxidants are added, they are added within the range of 0.05 to 5.0 parts by weight per 100 parts by weight of the cyclic olefin addition copolymer.

The cyclic olefin addition copolymer of the present invention can be further converted to a crosslinkable composition and a crosslinked product using method shown below.

1) In crosslinking by radicals, the following compositions and crosslinking methods are employed. In that case, the crosslinked product can be formed more easily in the cyclic olefin addition copolymer using the repeating unit (c) having a methacryloyl group or an acryloyl group in a side-chain substituent group.

a) A composition in which the copolymer is blended with a peroxide or an azo compound, and a method of crosslinking the composition by radicals generated using heat or active light.

b) A composition with a peroxide and a reducing metal compound, and a method of crosslinking the composition by radicals generated by redox reaction.

2) In crosslinking the copolymer using a hydrolytic silyl group-containing unit as the repeating unit (c) by hydrolysis and condensation reaction, the following compositions are used.

a) A composition with an oxide, an alkoxide, a phenoxide, a β-diketonate, an alkylate, a halide, an organic acid salt or the like of a metal such as tin, aluminum, zinc, titanium or antimony.

b) A composition with a compound acting as an acid by heating, such as an aromatic sulfonium salt, an aromatic ammonium salt, an aromatic pyridinium salt, an aromatic phosphonium salt, an aromatic iodonium salt, a hydrazinium salt or a ferrocenium salt, which has a counter anion selected from $BF_4^-$, $PF_6^-$, $AsF_6^-$, $SbF_6^-$, $B(C_6F_5)_4^-$ and the like.

c) A composition with a compound acting as an acid by heating in the presence of water or steam, such as a trialkylphosphite, a triarylphosphite, dialkylphosphite, monoalkylphosphite, a hypophosphite, an ester of an organic carboxylic acid with a secondary or tertiary alcohol, a hemiacetal-ester of an organic carboxylic acid, a trialkylsilyl ester of an organic carboxylic acid, a monocyclic or polycyclic cycloalkyl ester of an alkylsulfonic acid or a monocyclic or polycyclic cycloalkyl ester of an alkylarylsulfonic acid.

d) A composition with a photoacid generator which forms a Bronsted acid or a Lewis acid by irradiation of light rays such as g-rays, h-rays, i-rays, ultraviolet rays, far ultraviolet rays, X-rays or electron rays, for example, an onium salt such as a diazonium salt, an ammonium salt, a iodonium salt, a sulfonium salt, a phosphonium salt, an arsenium salt or an oxonium salt, a halogenated organic compound such as a halogen-containing oxadiazole compound, a halogen-containing triazine compound, a halogen-containing acetophenone compound or a halogen-containing benzophenone compound, a quinone diazide compound, an α,α-bis(sulfonyl)diazomethane compound, an α-carbonyl-α-sulfonyldiazomethane compound, a sulfonyl compound, an organic acid ester compound, an organic acid amide compound or an organic acid imide compound.

3) In the copolymer using an eater group-containing unit as the repeating unit (c), a composition with a polyhydric alcohol having 2 to 4 hydroxyl groups per molecule and the metal compound described in the above 2), a) as the catalyst is crosslinked by ester exchange reaction, thereby being able to form the crosslinked product.

A compound selected from these peroxide, azo compound, metal compound of 2), a) to d), acid-generating ester compound, thermal acid generator and polyhydric compound and the like is blended with the cyclic olefin addition copolymer of the present invention to form the crosslinkable composition, thereby being able to obtain the crosslinked product of the cyclic olefin addition copolymer under a relatively mild temperature condition of 10 to 280° C. In particular, the use of the compound acting as an acid by heating in the presence of water or steam described in 2), c) is preferred because not only the pot life of the composition is prolonged to give excellent storage stability, but also the characteristics of the crosslinked product obtained by heat treating the composition in the presence of water or steam, such as dimensional stability and solvent and chemical resistance, become excellent.

The crosslinked product of the present invention retains the excellent optical characteristics of the cyclic olefin addition copolymer, and further, the heat resistance is more enhanced, because it is crosslinked, to show a lower coefficient of linear expansion than the uncrosslinked copolymer, giving excellent breaking strength, breaking elongation, solvent and chemical resistance, and liquid crystal resistance.

The compound used for the above-mentioned crosslinking applications is blended within the range of 0.0001 to 5.0 parts by weight per 100 parts by weight of the cyclic olefin addition copolymer of the present invention.

In the crosslinkable composition of the present invention, there can also be further incorporated at least one compound selected from an alkoxide or allyloxide compound of a metal selected from silicon, titanium, aluminum and zirconium, and a condensate of the metal alkoxide having a condensation degree of 3 to 30. It becomes easy to obtain a crosslinked structure effective for improving dimensional stability or solvent and chemical resistance when the crosslinked product is formed, by incorporating such a compound. Specific examples thereof include tetramethoxysilane, tetraethoxysilane, tetraisopropoxysilane, methyltrimethoxysilane, methyltriethoxysilane, dimethyldimethoxysilane, dimethyldiethoxysilane, cyclohexyltrimethoxysilane, cyclohexyltriethoxysilane, dicyclohexyldimethoxysilane, cyclopentyltrimethoxysilane, bicyclo[2.2.1]hept-2-yltrimethoxysilane, 2-bicyclo[2.2.1]heptene-5-yltrimethoxysilane, aluminum trimethoxide, aluminum triethoxide, titanium tetraethoxide, zirconium tetraethoxide, a condensate thereof having a condensation degree of 3 to 30, and the like. Further, a composition with a silane compound having a radically polymerizable substituent group such as a methacryloyl group or an acryloyl group and a radical generator can be formed, and crosslinked by light or heat to obtain the crosslinked product.

In the composition with the above-mentioned alkoxide or allyloxide compound of a metal selected from silicon, titanium, aluminum and zirconium, or with the condensate thereof having a condensation degree of 3 to 30, it is preferably incorporated with in the range of 5 to 60 parts by weight per 100 parts by weight of the cyclic olefin addition copolymer of the present invention.

Further, in addition to the above-mentioned alkoxide or allyloxide compound of a metal selected from silicon, titanium, aluminum and zirconium; or the condensate thereof having a condensation degree of 3 to 30, particles or colloidal particles of a metal oxide such as silica, alumina, zirconia, titania or the like, which have an average particle size of 100 nm or less, may be blended to form a composition, and further a crosslinked product.

For the blending amount of the above-mentioned metal oxide (the blending amount converted to the solid content in the colloidal particles), it is blended in an amount of 1 to 40 parts by weight per 100 parts by weight of the cyclic olefin addition copolymer of the present invention. When the blending amount thereof is less than 1 part by weight, the effect of improvement by the metal oxide is insufficient in the hardness, elastic modulus, and coefficient of linear expansion of the crosslinked product obtained by crosslinking. On the other hand, when it exceeds 40 parts by weight, the crosslinked product obtained by crosslinking becomes brittle in some cases.

The cyclic olefin addition copolymer (composition) of the present invention can be formed into a thin membrane, a film or a sheet by the solution cast method of dissolving the copolymer (composition) in a solvent selected from a hydrocarbon solvent, a halogenated hydrocarbon solvent and a mixed solvent thereof, applying or flow casting the solution onto a steel belt, a carrier film or the like, followed by a drying step to obtain a formed article. Further, the copolymer (composition) can also be swelled in the solvent, and then, formed and processed into a thin membrane, a film or a sheet while evaporating the solvent in an extruder. Furthermore, the copolymer can also be blended with another thermoplastic resin to form a polymer blend composition, and formed into a thin membrane, a film or a sheet by a melt extrusion method using a melt extruder or the like.

Further, the cyclic olefin addition copolymer and hydrolysable silyl group- or ester group-containing cyclic olefin addition copolymer (composition) of the present invention are excellent in adhesioness or stickiness with other materials, so that they are also useful as a thin-film coating material or an adhesive.

The film or sheet containing the cyclic olefin addition copolymer of the present invention, the composition thereof and the crosslinked product thereof can satisfy heat resistance, washing resistance, transparency, adhesioness/stickiness and dimensional stability required for substrate materials in the steps of exposure, development, etching and the like in TFT (thin-film transistor) formation on substrates, and further, liquid crystal resistance and the like in liquid crystal injection, so that it is useful as an optical material used as a substrate for a flat display, such as a liquid crystal display element or an electroluminescence display element.

Further, the cyclic olefin addition copolymer of the present invention, the composition thereof, the crosslinked product thereof and the material containing the composition of the present invention have excellent optical transparency, low birefringence, heat resistance, adhesioness/stickiness, and low moisture absorption, so that they are useful as an optical material used for an optical waveguide, a polarizing film, a surface protective film, a light diffusion film, a phase difference film, a transparent conductive film, an antireflection film, an OHP film, an optical disk, an optical fiber, a lens and the like. Furthermore, they are also useful as electronic parts, a coating agent, an adhesives, further a medical container and a container.

EXAMPLES

The present invention will be illustrated in greater detail with reference to the following examples, but the invention should not be construed as being limited thereby.

Parts and percentages are based on weight, unless otherwise specified.

Further, the molecular weight, the change in hue by a thermal stability test, the total light transmittance, the glass transition temperature, the coefficient of linear expansion, the adhesioness/stickiness, the degree of swelling in toluene, the tensile strength, the elongation, the solution viscosity and a solubility test were measured by the following methods:

(1) $^1$H-NMR:

$^1$H-NMR was measured in a mixed solvent of benzene-$d_6$ and o-dichlorobenzene (volume ratio: 60/40), with heating as needed, at a resonant frequency of 270 MHz.

(2) Weight Average Molecular Weight and Number Average Molecular Weight:

The molecular weights were measured at 120° C. using a 150 C type gel permeation chromatography (GPC) system manufactured by Waters and an H type column manufactured by Tosoh Corporation, and using o-dichlorobenzene as a solvent. The resulting molecular weight is a standard polystyrene-converted value.

(3) Change in Hue by Thermal Stability Test:

A film was heat treated in the air at 240° C. for 1 hour, and the yellow index (YI value) was measured with transmitted light according to JIS K7105 for the film before and after the treatment. A change in hue was evaluated by a change thereof (ΔYI).

(4) Total Light Transmittance:

A film having a thickness of 150 μm was formed, and the total light transmittance was measured in accordance with ASTM-D1003.

(5) Glass Transition Temperature:

The glass transition temperature of a polymer was measured by the peak temperature of Tan δ (the ratio of loss modulus E" to storage modulus E', E"/E'=Tan δ) of dynamic viscoelasticity. The measurement of dynamic viscoelasticity was made using Leovibron DDV-01FP (manufactured by Orientic Co. Ltd.), and the glass transition temperature was determined by the peak temperature of temperature variance of Tan δ obtained at a measurement frequency of 10 Hz, at a rate of temperature increase of 4° C./minute, at a single waveform vibration mode and at a vibration amplitude of 2.5 μm.

(6) Coefficient of Linear Expansion:

Using TMA (Thermal Mechanical Analysis)/SS6100 (manufactured by Seiko Instrument Co., Ltd.), a sample having a film thickness of 100 μm, a width of 3 mm and a length of 10 cm or more was fixed thereto at a chuck distance of 10 mm, and once heated from room temperature to about 200° C. to remove residual strain. Then, the temperature of the sample was elevated from room temperature at 3° C./min., and the coefficient of linear expansion was determined from the elongation of the chuck distance.

(7) Adhesioness/Stickiness:

Aluminum was deposited on a test piece of 10 cm×10 cm, and the deposited film was cut with a cutter so as to form 10×10 squares of 1 mm×1 mm. A peeling test using a cellophane tape was conducted, and the number of peeled blocks of 25 blocks was measured.

(8) Degree of Swelling in Toluene:

A film about 50 to 250 μm in thickness and 2 cm×2 cm in length and width was immersed in toluene at 25° C. for 3 hours, and the weight of the film before and after the immersion was measured. The degree of swelling was calculated by the following equation:

Degree of swelling in toluene (%)=(weight of the film after immersion in toluene/weight of the film before immersion in toluene)×100

(9) Breaking Strength and Breaking Elongation:

A test piece was measured at a tensile rate of 3 mm/min. in accordance with JIS K7113.

(10) Solution Viscosity of Copolymer and Copolymer Composition:

The solution viscosity of a copolymer and a copolymer composition was measured at 25° C. using an RE80L rotational viscometer manufactured by TOKI Sangyo Co., Ltd. and 3°×R14 as a rotor.

(11) Solubility Test of Copolymer:

Five grams of a copolymer and 50 ml of a solvent were mixed in a 100-ml glass vial, and stirred at 50° C. for 2 hours. Then, the solution was cooled to 25° C. spending one hour, and the appearance of the polymer solution in the vial was observed.

○ . . . Dissolved (insoluble: less than 0.1%)

Δ . . . Partially dissolved (insoluble: 0.1 to 95%)

× . . . Not dissolved (insoluble: more than 95%)

● . . . Dissolved only under heating at 120° C. or higher (insoluble: less than 0.1%)

▲ . . . Partially dissolved only under heating at 120° C. or higher (insoluble: 0.1 to 95%)

(12) Analysis of Unreacted Monomer:

A part of a polymerization reaction solution was collected, and tetralin was added as a standard material. The solution was coagulated with isopropyl alcohol. Using a GC-14B gas chromatography system manufactured by Shimadzu Corporation, and using a TC-1 capillary column (film thickness: 1.0 μm, internal diameter: 0.25 mm, length: 60 m, column temperature: 200° C.) manufactured by GL Sciences Inc. as a column, the amounts of unreacted monomers remaining in a supernatant after the coagulation were determined, and the contents of the respective monomer components contained in the copolymer were calculated. The monomers used as raw materials were subjected to the gas chromatography analysis under the same analysis conditions.

SYNTHESIS EXAMPLES

As endo-tricyclo[4.3.0.1$^{2,5}$]deca-3,7-diene, a commercially available one was purified by distillation under reduced pressure to use. The endo/exo ratio analyzed by gas chromatography was 99/1 or more.

endo-Tricyclo[4.3.0.1$^{2,5}$]deca-3-ene was synthesized with reference to methods described in U.S. Pat. No. 4,139,569 and *Makromol. Chem.*, Vol. 95, 179 (1966), and purified by distillation under reduced pressure using a distilling apparatus having a theoretical plate number of 40. The resulting product having a purity of 99% or more and an endo/exo ratio of 90/10 or 96/4 was used.

exo-Tricyclo[4.3.0.1$^{2,5}$]deca-3,7-diene was synthesized with reference to methods described in *J. Am. Chem. Soc.*, 69, 2553 (1947) and *Synthesis* 105 (1975), and purified by distillation under reduced pressure. The resulting product having a purity of 99% or-more and an endo/exo ratio of 4/96 was used.

exo-Tricyclo[4.3.0.1$^{2,5}$]deca-3-ene was synthesized with reference to methods described in *J. Am. Chem. Soc.*, 69, 2553 (1947), *J. Am. Chem. Soc.*, Vol. 82, 2351 (1960) and *Synthesis* 105 (1975), and purified by distillation under reduced pressure. The resulting product having a purity of 99% or more and an endo/exo ratio of 10/90 was used.

endo-Tricyclo[4.4.0.1$^{2,5}$]undeca-3,7-diene was obtained by reacting dicyclopentadiene with 1,3-cyclohexadiene by the Diels-Alder reaction using a known technique, and performing purification under reduced pressure. The resulting product having a purity of 99% or more and an endo/exo ratio of 85/15 was used.

endo-Tricyclo[4.4.0.1$^{2,5}$]trideca-3,11-diene was obtained by reacting dicyclopentadiene with 1,3-cyclooctadiene by the Diels-Alder reaction using a known technique, and performing purification under reduced pressure. The resulting product having a purity of 99% or more and an endo/exo ratio of 80/120 was used.

Example 1

A 2-liter stainless steel reaction vessel was charged with 47 g (500 mmol) of bicyclo[2.2.1]hept-2-ene, 66 g (500 mmol) of endo-tricyclo[4.3.0.1$^{2,5}$]deca-3,7-diene, 0.42 g (5 mmol) of 1-hexene, and 480 g of toluene and 85 g of cyclohexane as solvents under nitrogen.

A hexane solution of nickel octanoate was reacted with hexafluoroantimonic acid at −10° C. at a molar ratio of 1:1, and a precipitate of nickel bis(hexafluoroantimonate) [Ni (SbF$_6$)$_2$] formed as a by-product was removed by filtration. The resulting product was diluted with toluene. A reaction vessel was charged with 0.40 mmol (as a nickel atom) of the resulting hexafluoroantimonic acid-modified product of nickel octanoate, 1.2 mmol of boron trifluoride ethyl etherate, 8.0 mmol of methylalumoxane, 0.4 mmol of 1,5-cyclooctadiene and 8.0 mmol of methyltriethoxysilane in the order of methyltriethoxysilane, 1,5-cyclooctadiene, methylalumoxane, boron trifluoride ethyl etherate and the hexafluoroantimonic acid-modified product of nickel octanoate, and polymerization was initiated. The polymerization was conducted at 30° C. for 3 hours, and methanol was added to terminate the polymerization. The conversion rate of the monomers to the copolymer was 73%.

To the copolymer solution, 480 g of cyclohexane was added to dilute it, and 660 ml of water and 48 mmol of lactic acid were added thereto, followed by sufficient stirring and mixing. Then, the copolymer solution and an aqueous phase were separated from each other by still standing. The aqueous phase containing a reaction product of the catalyst component was removed, and the copolymer solution was poured into 4 L of isopropyl alcohol to coagulate the copolymer, thereby removing unreacted monomers and a catalyst residue. The coagulated copolymer was dried to obtain 75 g of copolymer A. By $^1$H-NMR measurement of the copolymer and gas chromatography analysis of the unreacted monomers, the content of structural units derived from endo-tricyclo[4.3.0.1$^{2,5}$]deca-3,7-diene in copolymer A was 37 mol %. (The ratio of the structure derived from tricyclo[4.3.0.1$^{2,5}$]deca-3,7-diene in copolymer A was determined from the ratio of absorption caused by a cyclopentene ring olefin structure derived from tricyclo[4.3.0.1$^{2,5}$]deca-3,7-diene at 5.5 to 6.2 ppm to that caused by all protons of a norbornene ring at 0.7 to 3.3 ppm, and further, the ratio of the structure derived from endo-tricyclo[4.3.0.1$^{2,5}$]deca-3,7-diene in copolymer A was determined from the amounts of unreacted endo- and exo-tricyclo[4.3.0.1$^{2,5}$]deca-3,7-diene charged and determined by gas chromatography analysis. The same method was also used in the following examples and comparative examples.)

The polystyrene-converted number average molecular weight (Mn) of copolymer A was 82,000, the weight average molecular weight (Mw) was 151,000, and Mw/Mn was 1.8.

Thirty grams of this copolymer A was dissolved in a mixed solvent of 285 g of cyclohexane and 285 g of toluene, and hydrogenation was conducted in a 2-liter pressure vessel using 2.2 mg of a ruthenium catalyst represented by RuHCL (CO)[PPh$_3$]$_3$ at a hydrogen pressure of 8 MPa at 180° C. for 4 hours. After hydrogen was purged, 50 g of diatomaceous earth (Radiolite #800 manufactured by Showa Chemical Industry Co., Ltd.) was added to the copolymer solution, followed by stirring at 60° C. for 2 hours. Then, diatomaceous earth was separated by filtration. The hydrogenated copolymer solution after the separation by filtration was washed with an aqueous solution of lactic, acid to remove a catalyst residue, and coagulated with isopropyl alcohol to obtain 25 g of hydrogenated copolymer AH. The rate of hydrogenation of copolymer AH determined from $^1$H-NMR measurement was 99%. A $^1$H-NMR spectrum of copolymer AH is shown in FIG. 1. Further, the results of the solubility test of copolymer AH are shown in Table 1.

Then, 10 g of hydrogenated copolymer AH was dissolved in 35.5 g of cyclohexane, and pentaerythrityltetrakis[3-(3, 5-di-t-butyl-4-hydroxyphenyl)propionate] was added as an antioxidant in an amount of 1.0 part based on 100 parts of the copolymer. A film was prepared from this copolymer solution by a cast method, and dried at 150° C. for 2 hours and further at 200° C. for 1 hour under vacuum to prepare film AH-1 having a thickness of 150 μm. As the evaluation results shown in Table 2, the film was little discolored at high temperatures, and excellent in breaking strength/breaking elongation.

Comparative Example 1

Ten grams of unhydrogenated copolymer A was dissolved in 35.5 g of cyclohexane, and pentaerythrityltetrakis[3-(3, 5-di-t-butyl-4-hydroxyphenyl)propionate] was added as an antioxidant in an amount of 1.0 part based on 100 parts of the copolymer. A film was prepared from this copolymer solution by a cast method, and dried at 150° C. for 2 hours and further at 200° C. for 1 hour under vacuum to prepare film A-1 having a thickness of 150 μm. From the evaluation results shown in Table 2, the film was clearly inferior in heat deterioration resistance and breaking strength/breaking elongation, compared to AH-1.

Example 2

Polymerization was conducted in the same manner as with Example 1 with the exception that 625 mmol of bicyclo[2.2.1]hept-2-ene, 587 mmol of endo-tricyclo [4.3.0.1$^{2,5}$]deca-3,7-diene and 37 mmol of 5-triethoxysilyl-bicyclo[2.2.1]hept-2-ene were used as monomers, thereby obtaining copolymer B at a conversion rate of 62%. The ratio of structural units derived from endo-tricyclo[4.3.0.1$^{2,5}$]deca-3,7-diene in copolymer B was 37 mol %. Further, the ratio of structural units derived from 5-triethoxysilylbicyclo [2.2.1]hept-2-ene, which was determined from a $^1$H-NMR spectrum, was 3.0 mol % (calculated from the ratio of CH$_2$ absorption of an Si—O—CH$_2$— group at 3.7 to 4.1 ppm to absorption of all other protons). The polystyrene-converted number average molecular weight of copolymer B was 60,000, the weight average molecular weight was 121,000, and Mw/Mn was 2.0.

Figure 2:
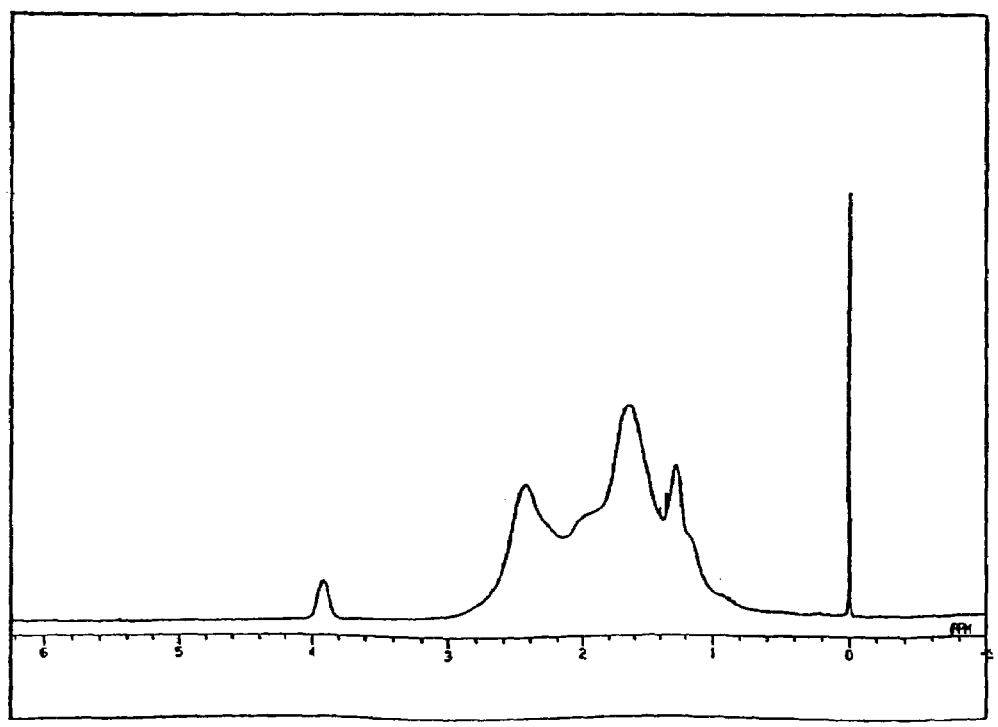
FIG. 2 is a $^1$H-NMR spectrum of a copolymer obtained in Example 2.

Then, using the above-mentioned copolymer B in place of copolymer A and the same solvent and catalyst as with Example 1, hydrogenation was conducted at a hydrogen pressure of 8 MPa at 120° C. for 4 hours. A copolymer solution was treated by the same technique as with Example 1 to obtain hydrogenated copolymer BH. The rate of hydrogenation of copolymer BH determined from $^1$H-NMR measurement was 99%. A $^1$H-NMR spectrum of copolymer BH is shown in FIG. 2, and further, the results of the solubility test are shown in Table 1.

Then, 10 g of hydrogenated copolymer BH was dissolved in 35.5 g of cyclohexane. Pentaerythrityltetrakis[3-(3,5di-t-butyl- 4-hydroxyphenyl)propionate] was added as an antioxidant in an amount of 1.0 part based on 100 parts of the copolymer, and tributyl phosphite was added as a crosslinking catalyst in an amount of 0.5 part based on 100 parts of the copolymer. The solution viscosity (25° C.) of this copolymer composition was 2,200 (cp). The solution viscosity (25° C.) after storage of this copolymer solution in a hermetically sealed glass container for 1 week was 2,400 (cp) A film was prepared from this copolymer solution by a cast method, and dried at 150° C. for 2 hours and further at 200° C. for 1 hour under vacuum to prepare uncrosslinked film BH-1 having a thickness of 150 μm. Further, film BH-1 was heat treated under steam of 150° C. for 4 hours, and then, dried at 200° C. for 1 hour under vacuum to obtain crosslinked film BH-2. As apparent from the evaluation results of BH-1 and BH-2 shown in Table 2, the transparency of the film was kept, even after heat treatment, and the film was excellent in braking strength/breaking elongation. In addition, by using 5-triethoxysilylbicyclo[2.2.1]hept-2-ene and further conducting treatment-with steam, crosslinking reaction effectively proceeds, braking strength/elongation were further improved, and the film became insoluble in toluene to provide the film excellent in chemical resistance/solvent resistance.

Comparative Example 2

Ten grams of copolymer B obtained in Example 2 was dissolved in 35.5 g of cyclohexane, and pentaerythrityltetrakis[3(3,5-di-t-butyl-4-hydroxyphenyl)propionate] was added as an antioxidant in an amount of 1.0 part based on 100 parts of the copolymer, and tributyl phosphite was added as a crosslinking catalyst in an amount of 0.5 part based on 100 parts of the copolymer. This copolymer solution was cast, and a film formed was dried at 150° C. for 2 hours and further at 200° C. for 1 hour under vacuum to prepare unhydrogenated/uncrosslinked film B-1 having a thickness of 150 μm. Further, film B-1 was heat treated under steam of 150° C. for 4 hours, and then, dried at 200° C. for 1 hour under vacuum to obtain unhydrogenated/crosslinked film B-2.

The evaluation results of films B-2 are shown in Table 2. In the unhydrogenated copolymer, the film was remarkably discolored to yellow after heat treatment, resulting in the film having low heat deterioration resistance.

Example 3

Polymerization was conducted in the same manner as with Example 1 with the exception that 625 mmol of bicyclo[2.2.1]hept-2-ene, 587 mmol of endo-tricyclo[4.3.0.1$^{2,5}$]deca-3,7-diene and 37 mmol of 5-[1',4',4'-trimethyl-2',6'-dioxa-1'-silacyclohexyl]bicyclo[2.2.1]hept-2-ene were used as monomers, thereby obtaining copolymer C. The conversion rate to the copolymer was 60%. The ratio of structural units derived from endo-tricyclo[4.3.0.1$^{2,5}$]deca-3,7-diene in copolymer C was 36 mol %. Further, the ratio of structural units derived from 5-[1',4',4'-trimethyl-2',6'-dioxa-1'-silacyclohexyl] bicyclo[2.2.1]hept-2-ene, which was determined from a 1H-NMR spectrum, was 3.0 mol % (calculated from the ratio of $CH_2$ absorption of an Si—O—$CH_2$— group at 3.4 to 4.0 ppm to absorption of all other protons). The polystyrene-converted number average molecular weight of copolymer C was 116,000, the weight average molecular weight was 278,000, and Mw/Mn was 2.4.

Figure 3:
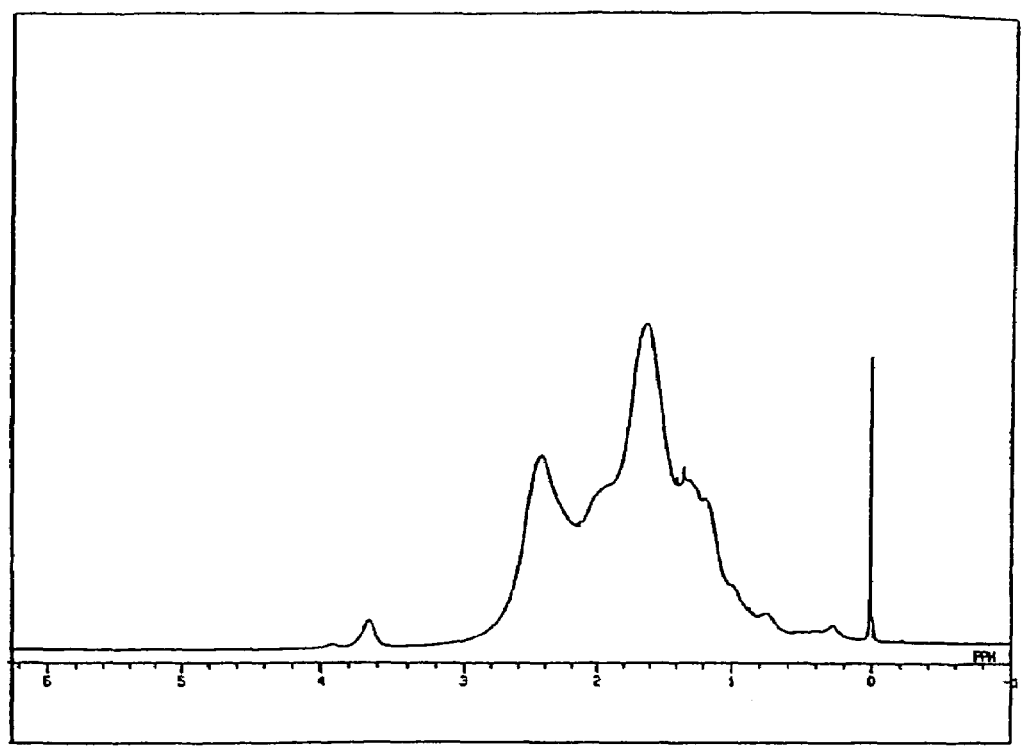
FIG. 3 is a $^1$H-NMR spectrum of a copolymer obtained in Example 3.

Then, using the above-mentioned copolymer C, hydrogenation and after treatment were conducted by the same technique as with Example 2 to obtain hydrogenated copolymer CH. The rate of hydrogenation of copolymer CH determined from $^1$H-NMR measurement was 99%. A $^1$H-NMR spectrum of copolymer CH is shown in FIG. 3, and the results of the solubility test are shown in Table 1.

Then, 10 g of hydrogenated copolymer CH was dissolved in 35.5 g of cyclohexane. Pentaerythrityltetrakis[3-(3,5di-t-butyl-4-hydroxyphenyl)propionate] was added as an antioxidant in an amount of 1.0 part based on 100 parts of the polymer, and tributyl phosphite was added as a crosslinking catalyst in an amount of 0.5 part based on 100 parts of the polymer. The solution viscosity (25° C.) of this copolymer composition was 3,100 (cp). The solution viscosity (25° C.) after storage of this copolymer solution in a hermetically sealed glass container for 1 week was 3,150 (cp). A film was prepared from this copolymer solution by a cast method, and dried at 150° C. for 2 hours and further at 200° C. for 1 hour under vacuum to prepare uncrosslinked film CH-1 having a thickness of 150 μm. Further, film CH-1 was heat treated under steam of 150° C. for 4 hours, and then, dried at 200° C. for 1 hour under vacuum to obtain crosslinked film CH-2. As apparent from the evaluation results of shown in Table 2, the film obtained from copolymer CH was excellent in thermal stability. Further, by conducting treatment with steam, crosslinking reaction effectively proceeds, braking strength/elongation were further improved, and the film became insoluble in toluene to provide the film excellent in chemical resistance/solvent resistance. In addition, by using 5-[1',4',4'-trimethyl-2',6'dioxa-1'silacyclohexyl]bicyclo [2.2.1]hept-2-ene as a crosslinking group-containing monomer, the solution viscosity of the copolymer composition was scarcely changed even after 1 week, and the solution was more excellent in storage stability.

Comparative Example 3

Ten grams of copolymer C obtained in Example 3 was dissolved in 35.5 g of cyclohexane, and pentaerythrityltetrakis[3-(3,5-di-t-butyl-4-hydroxyphenyl)propionate] was added as an antioxidant in an amount of 1.0 part based on 100 parts of the copolymer, and tributyl phosphite was added as a crosslinking catalyst in an amount of 0.5 part based on 100 parts of the copolymer. This copolymer solution was cast, and a film formed was dried at 150° C. for 2 hours and further at 200° C. for 1 hour under vacuum to prepare unhydrogenated/uncrosslinked film C-1 having a thickness of 150 μm. Further, film C-1 was heat treated under steam of 150° C. for 4 hours, and then, dried at 200° C. for 1 hour under vacuum to obtain unhydrogenated/crosslinked film C-2.

The evaluation results of films C-1 and C-2 are shown in Table 2. In the unhydrogenated copolymer, the film was remarkably discolored to yellow after heat treatment, regardless of whether the film had been crosslinked or uncrosslinked, resulting in the film having low heat deterioration resistance.

Example 4

Polymerization was conducted in the same manner as with Example 3 with the exception that 78 g of toluene, 168 g of cyclohexane and 164 g of methylene chloride were used as solvents, thereby obtaining copolymer D at a conversion rate of 93%. The ratio of structural units derived from endo-tricyclo[4.3.0.1$^{2,5}$]deca-3,7-diene in copolymer D was 40 mol %, and the ratio of structural units derived from 5-[1',4',4'-trimethyl-2',6'-dioxa-1'-silacyclohexyl]bicyclo[2.2.1]hept2-ene was 3.0 mol %.

The polystyrene-converted number average molecular weight of copolymer D was 112,000, the weight average molecular weight was 224,000, and Mw/Mn was 2.0.

Figure 4:
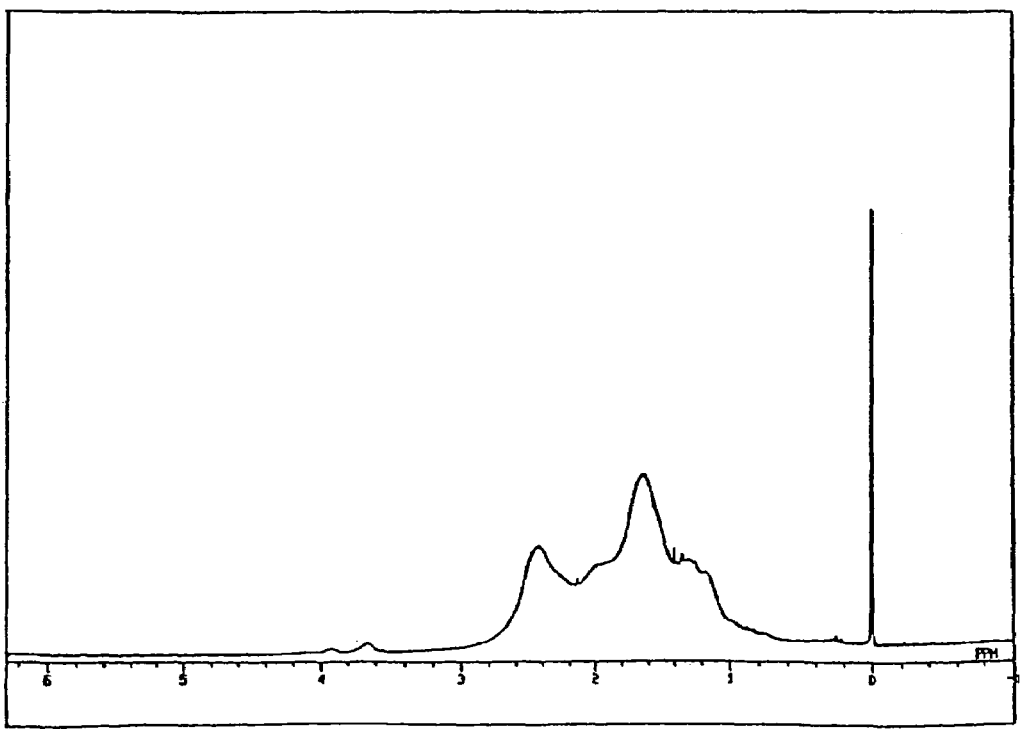
FIG. 4 is a $^1$H-NMR spectrum of a copolymer obtained in Example 4.

The above-mentioned copolymer D was hydrogenated by the same technique as with Example 2 to obtain hydrogenated copolymer DH. The rate of hydrogenation determined from a $^1$H-NMR spectrum of polymer DH was 99%. The $^1$H-NMR spectrum of copolymer DH is shown in FIG. 4, and the results of the solubility test are shown in Table 1.

Then, using copolymer DH, uncrosslinked film DH-1 and crosslinked film DH-2 were prepared by the same technique as with Example 2. The evaluation results of film DH-2 are shown in Table 2.

Example 5

Polymerization was conducted in the same manner as with Example 4 with the exception that 587 mmol of endo-tricyclo[4.3.0.1$^{2,5}$]deca-3-ene (endo/exo=96/4) was used as a monomer in place of endo-tricyclo[4.3.0.1$^{2,5}$]deca-3,7-diene, thereby obtaining copolymer E at a conversion rate of 90%. The ratio of structural units derived from 5-[1',4',4'-trimethyl-2',6'-dioxa-1'-silacyclohexyl]bicyclo[2.2.1]hept-2-ene in copolymer E was 2.8 mol %. Further, the ratio of structural units derived from endo-tricyclo[4.3.0.1$^{2,5}$]deca-3-ene in copolymer E was 39 mol %. The polystyreneconverted number average molecular weight of copolymer E was 108,000, the weight average molecular weight was 211,000, and Mw/Mn was 2.0.

Figure 5:
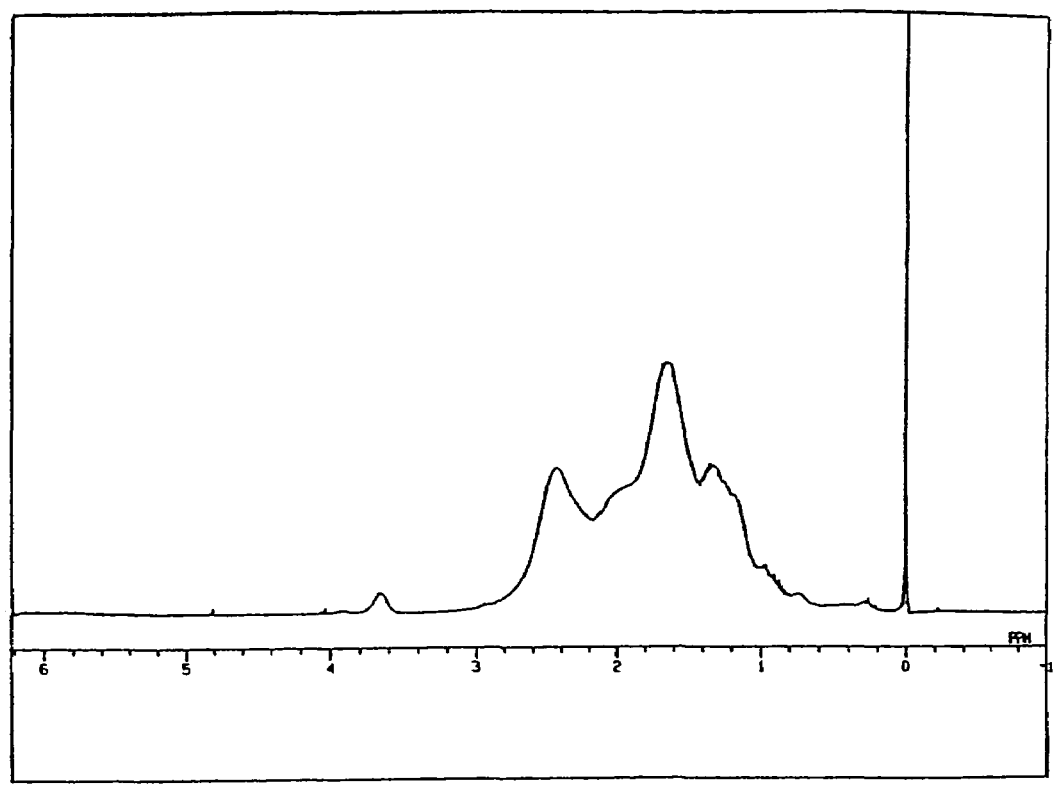
FIG. 5 is a $^1$H-NMR spectrum of a copolymer obtained in Example 5.

A $^1$H-NMR spectrum of copolymer E is shown in FIG. 5, and the results of the solubility test of copolymer E are shown in Table 1.

Then, 10 g of copolymer E was dissolved in 35.5 g of cyclohexane, and pentaerythrityltetrakis[3-(3,5-di-tbutyl4-hydroxyphenyl)propionate] was added as an antioxidant in an amount of 1.0 part based on 100 parts of the copolymer, and tributyl phosphite was added as a crosslinking catalyst in an amount of 0.5 part based on 100 parts of the copolymer. This copolymer solution was cast, and a film formed was dried at 150° C. for 2 hours and further at 200° C. for 1 hour under vacuum to prepare uncrosslinked film E-1 having a thickness of 150 µm. Further, this film was heat treated under steam of 150° C. for 4 hours, and then, dried at 200° C. for 1 hour under vacuum to obtain crosslinked film E-2. The evaluation results of film E-2 are shown. By using endo-tricyclo[4.3.0.1$^{2,5}$]deca-3-ene which is a monomer having no unsaturated bond on its side chain, the film having a smaller change in hue by heat and excellent in stability compared to hydrogenated copolymers (AH to DH) prepared in Examples 1 to 4 was obtained without going through the hydrogenation process.

Example 6

Operations were conducted in the same manner as with Example 2 with the exception that 37 mmol of 5-(methyldiethoxysilyl)bicyclo[2.2.1]hept-2-ene was used as a monomer in place of 5-triethoxysilylbicyclo[2.2.1]hept2-ene, thereby obtaining copolymer F at a conversion rate of 52%.

The ratio of structural units derived from endo-tricyclo[4.3.0.1$^{2,5}$]deca-3,7-diene in copolymer F was 34 mol %. Further, the ratio of structural units derived from 5-(methyldiethoxysilyl)bicyclo[2.2.1]hept-2-ene, which was determined from a $^1$H-NMR spectrum, was 2.5 mol % (calculated from the ratio of CH$_2$ absorption of an Si—O—CH$_2$— group at 3.6 to 4.0 ppm to absorption of all other protons). The polystyrene-converted number average molecular weight of copolymer F was 72,000, the weight average molecular weight was 165,000, and Mw/Mn was 2.3.

Figure 6:
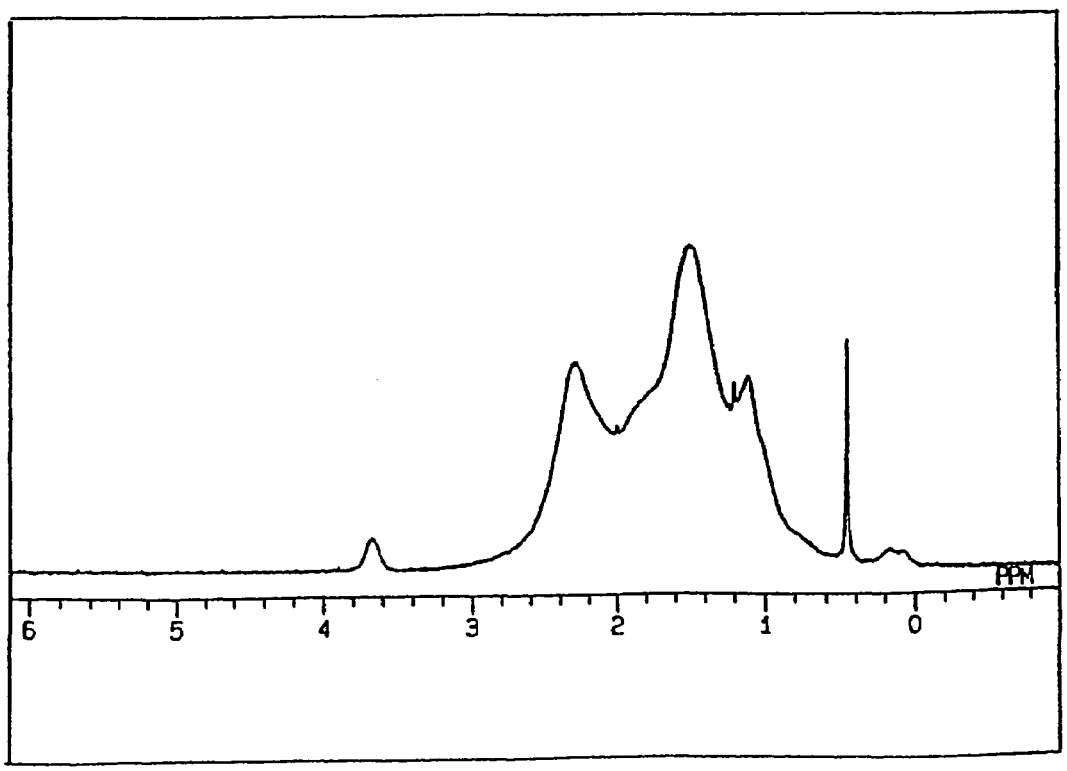
FIG. 6 is a $^1$H-NMR spectrum of a copolymer obtained in Example 6.

Using the above-mentioned copolymer F, hydrogenation was conducted by the same technique as with Example 2 to obtain hydrogenated copolymer FH. The rate of hydrogenation determined from a $^1$H-NMR spectrum of copolymer FH was 99%. The $^1$H-NMR spectrum of copolymer FH is shown in FIG. 6, and the results of the solubility test of copolymer FH are shown in Table 1.

Then, uncrosslinked film FH-1 was prepared from copolymer FH by the same technique as with Example 2. Further, film FH-1 was subjected to crosslinking treatment by the same technique as with Example. 2 to prepare crosslinked film FH-2. The evaluation results of film FH-2 are shown in Table 2.

Example 7

Using 78 g of toluene, 168 g of cyclohexane and 164 g of methylene chloride as solvents, and 1020 mmol of bicyclo[2.2.1]hept-2-ene, 190 mmol of endo-tricyclo[4.3.0.1$^{2,5}$]deca-3,7-diene and 40 mmol of 5-triethoxysilylbicyclo[2.2.1]hept2-ene as monomers, copolymer G was obtained at a conversion rate of 92% by the same technique as with Example 4. The ratio of structural units derived from endo-tricyclo[4.3.0.1$^{2,5}$]deca-3,7-diene in copolymer G was 15 mol %, and the ratio of structural units derived from 5-triethoxysilylbicyclo[2.2.1]hept-2-ene was 3.0 mol %. The polystyrene-converted number average molecular. weight of copolymer G was 72,000, the weight average molecular weight was 143,000, and Mw/Mn was 2.0.

Figure 7:
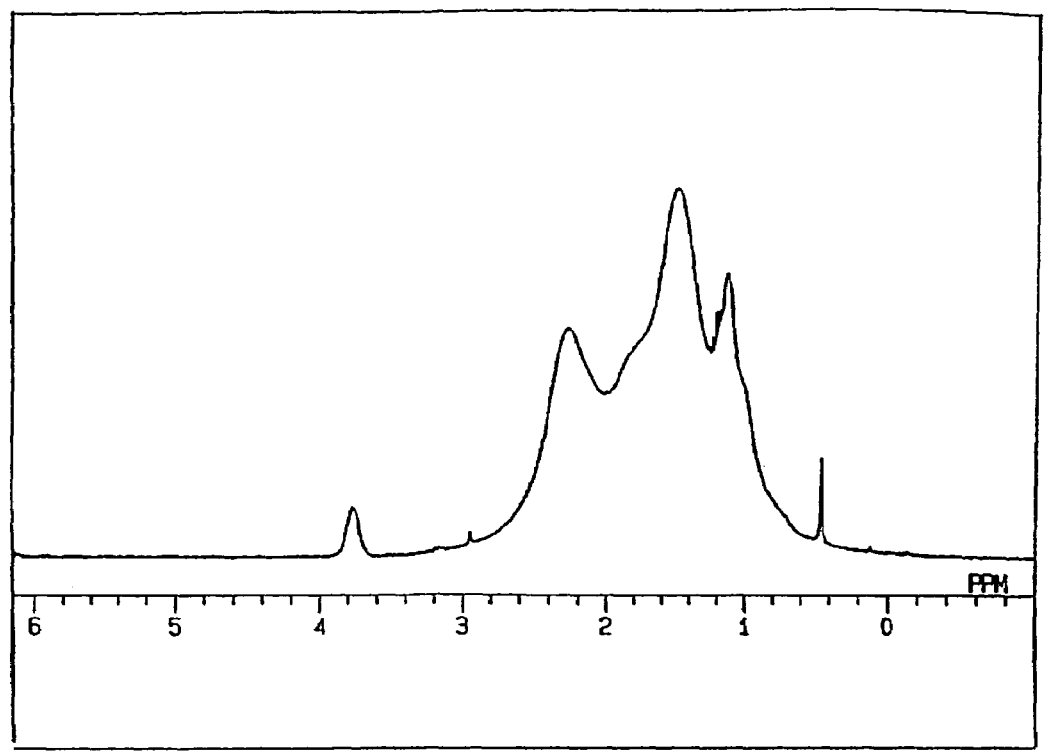
FIG. 7 is a $^1$H-NMR spectrum of a copolymer obtained in Example 7.

The above-mentioned copolymer G was hydrogenated by the same technique as with Example 2 to obtain hydrogenated copolymer GH. The rate of hydrogenation determined from a $^1$H-NMR spectrum of copolymer GH was 99%. The $^1$H-NMR spectrum of copolymer GH is shown in FIG. 7, and the results of the solubility test of copolymer GH are shown in Table 1.

Uncrosslinked film GH-1 and crosslinked film GH-2 were prepared from copolymer GH by the same technique as with Example 2. The evaluation results of film GH-2 are shown in Table 2.

Example 8

Copolymer H was obtained at a conversion rate of 77% in the same manner as with Example 1 with the exception that 500 mmol of bicyclo[2.2.1]hept-2-ene, 400 mmol of endotricyclo[4.3.0.1$^{2,5}$]deca-3-ene having an endo/exo ratio of 90/10 and 100 mmol of 5-hexylbicyclo[2.2.1]hept2-ene were used as monomers. The ratio of structural units derived from endo-tricyclo[4.3.0.1$^{2,5}$]deca-3-ene in copolymer H was 31 mol %. Further, the ratio of structural units derived from 5-hexylbicyclo[2.2.1]hept-2-ene, which was determined from a $^1$H-NMR spectrum, was 8 mol % (calculated from the ratio of absorption of a terminal methyl group of a hexyl group at 0.9 to 1.1 ppm to absorption of all other protons).

The polystyrene-converted number average molecular weight of copolymer H was 137,000, the weight average molecular weight was 261,000, and Mw/Mn was 1.9.

Figure 8:
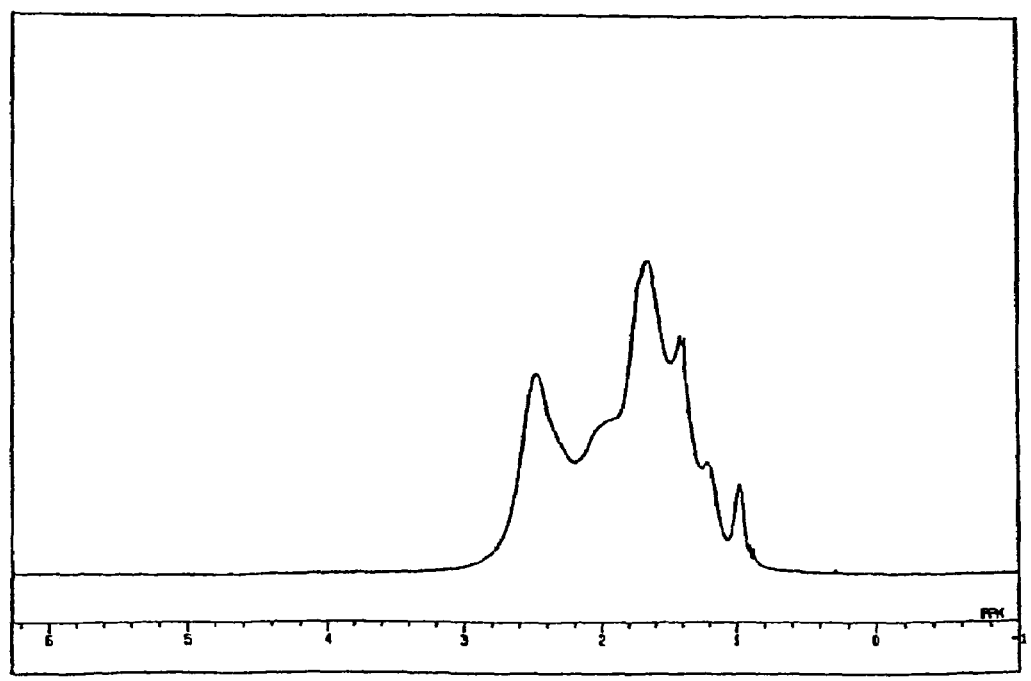
FIG. 8 is a $^1$H-NMR spectrum of a copolymer obtained in Example 8.

The $^1$H-NMR spectrum of copolymer H is shown in FIG. 8, and the results of the solubility test of copolymer H are shown in Table 1.

Subsequently, film H-1 having a thickness of about 150 μm was prepared from copolymer H in the same manner as with Example 1. The evaluation results of film H-1 are shown in Table 2.

Example 9

Figure 9:
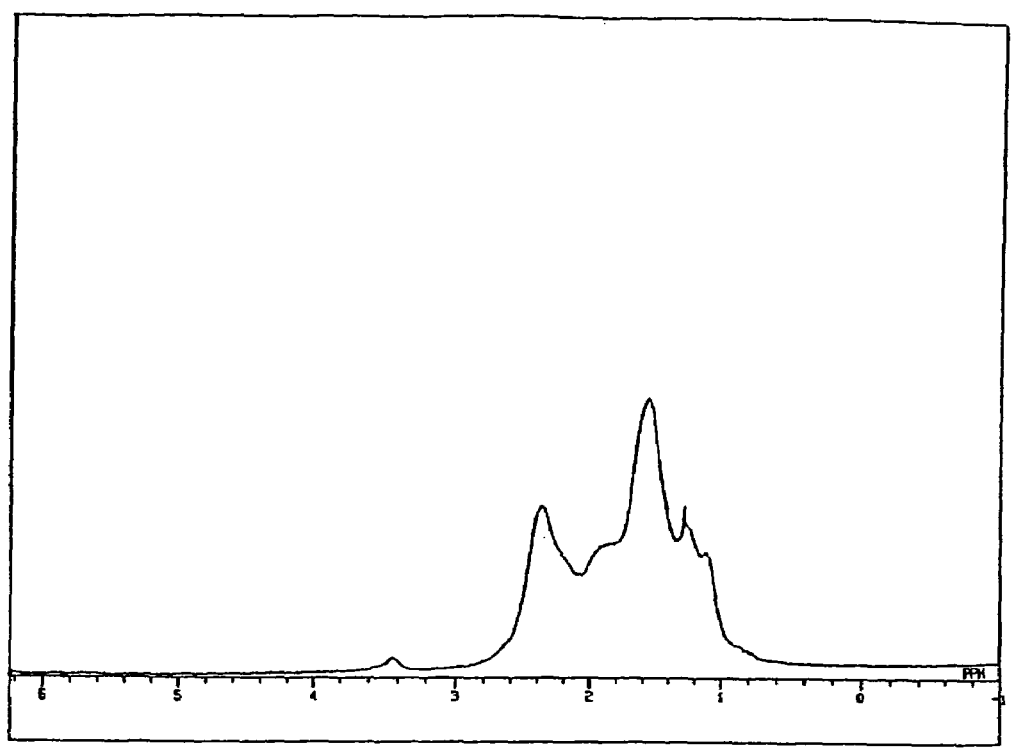
FIG. 9 is a $^1$H-NMR spectrum of a copolymer obtained in Example 9.

Copolymer I was obtained at a conversion rate of 75% in the same manner as with Example 1 with the exception that 750 mmol of bicyclo[2.2.1]hept-2-ene, 450 mmol of endotricyclo[4.3.0.1$^{2,5}$]deca3-ene (endo/exo ratio: 96/4) and 50 mmol of 8-methyl-8-methcarbonyltetracyclo[4.4.0.1$^{2,5}$.1$^{7,10}$]dodeca-3-ene as monomers. The ratio of structural units derived from endo-tricyclo[4.3.0.1$^{2,5}$]deca-3-ene in copolymer I was 29 mol %. Further, the ratio of structural units derived from 8-methyl-8-methcarbonyltetracyclo [4.4.0.1$^{2,5}$.1$^{7,10}$]dodeca-3-ene, which was determined from a $^1$H-NMR spectrum, was 4 mol % (calculated from the ratio of absorption at 3.3 to 3.7 ppm to absorption of all other protons). The polystyrene-converted number average molecular weight of copolymer I was 89,000, the weight average molecular weight was 177,000, and Mw/Mn was 2.0. The $^1$H-NMR spectrum of copolymer I is shown in FIG. 9, and the results of the solubility test of copolymer I are shown in Table 1.

Subsequently, film I-1 having a thickness of about 150 μm was prepared from copolymer I in the same manner as with Example 1. The evaluation results of film I-1 are shown in Table 2.

Example 10

Operations were conducted in the same manner as with Example 4 with the exception that 625 mmol of bicyclo[2.2.1]hept-2-ene, 587 mmol of endo-tricyclo[4.4.0.1$^{2,5}$]undeca-3,7-diene (endo/exo=85/15) and 37 mmol of 5-triethoxysilylbicyclo[2.2.1]hept-2-ene were used as monomers, and 78 g of toluene, 168 g of cyclohexane and 164 g of methylene chloride were used as solvents, thereby obtaining copolymer J at a conversion rate of 85%. The ratio of structural units derived from endo-tricyclo[4.4.0.1$^{2,5}$]undeca-3,7-diene in copolymer J was 33 mol %, and the ratio of structural units derived from 5-triethoxysilylbicyclo[2.2.1]hept-2-ene was 3.0 mol %. The polystyrene-converted number average molecular weight of copolymer J was 102,000, the weight average molecular weight was 197,000, and Mw/Mn was 1.9.

Figure 10:
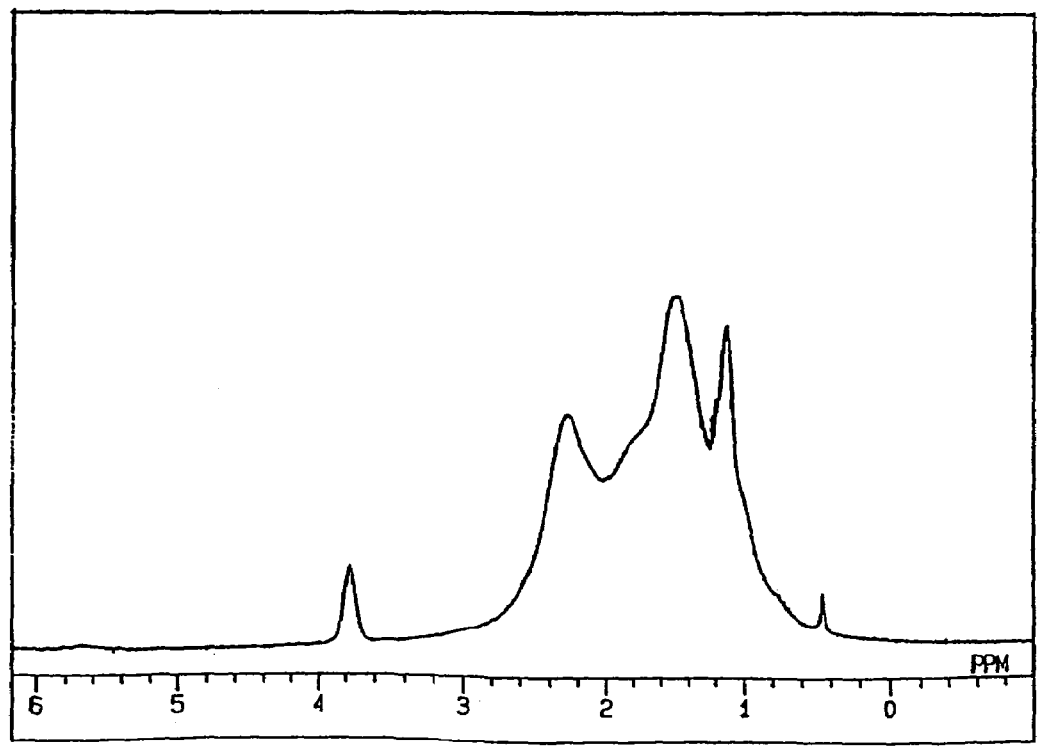
FIG. 10 is a $^1$H-NMR spectrum of a copolymer obtained in Example 10.

Using the above-mentioned copolymer J, hydrogenation was conducted by the same technique as with Example 2 to obtain hydrogenated copolymer JH. The rate of hydrogenation of copolymer JH determined from a $^1$H-NMR spectrum was 99%. The $^1$H-NMR spectrum of copolymer JH is shown in FIG. 10, and the results of the solubility test of polymer JH are shown in Table 1. Uncrosslinked film JH-1 and crosslinked film JH-2 were prepared from polymer JH by the same technique as with Example 2. The evaluation results of film JH-2 are shown in Table-2.

Example 11

Polymerization was conducted by the same technique as with Example 10 with the exception that 587 mmol of tricyclo[6.4.0.1$^{2,5}$]trideca-3,11-diene (endo/exo=80/20) was used as a monomer in place of endo-tricyclo[4.4.0.1$^{2,5}$]undeca-3,7-diene to obtain copolymer K at a conversion rate of 65%.

The ratio of structural units derived from endo-tricyclo[6.4.0.1$^{2,5}$]trideca-3,11-diene in copolymer K was 30 mol %, and the ratio of structural units derived from 5-triethoxysilylbicyclo[2.2.1]hept-2-ene was 2.5 mol %. The polystyrene-converted number average molecular weight of copolymer K was 83, 000, the weight average molecular weight was 167,000, and Mw/Mn was 2.0.

Figure 11:
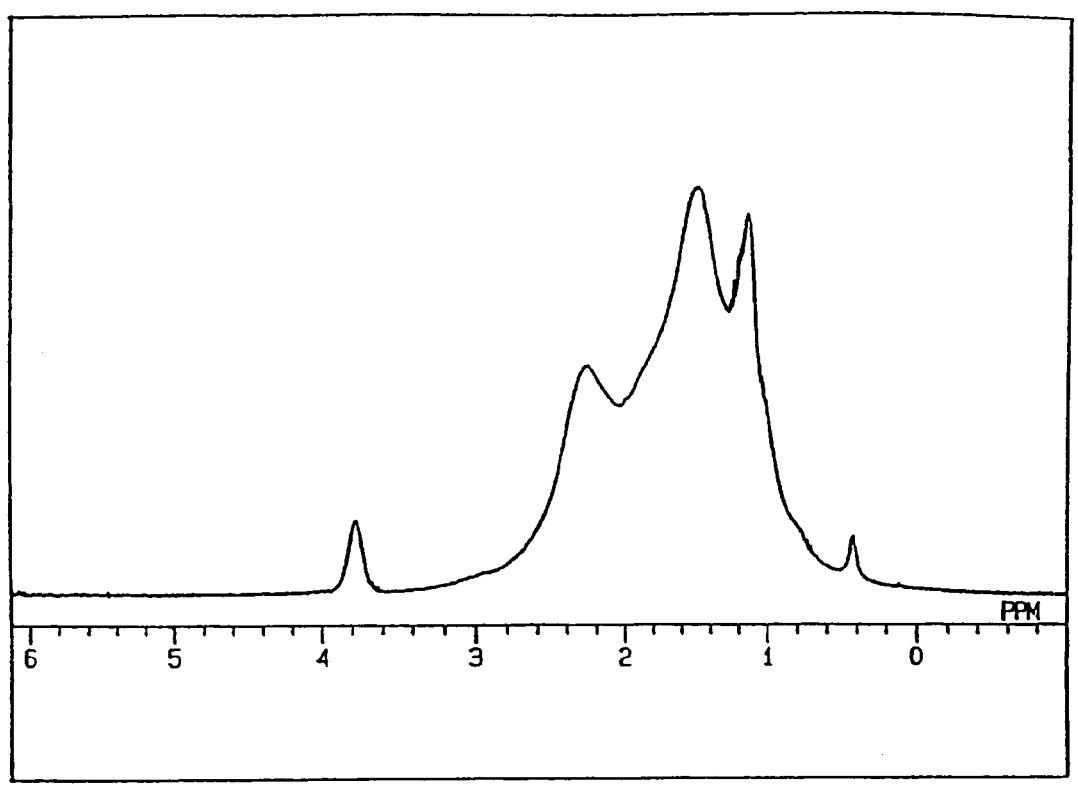
FIG. 11 is a $^1$H-NMR spectrum of a copolymer obtained in Example 11.

Using the above-mentioned copolymer K, hydrogenation was conducted by the same technique as with Example 2 to obtain hydrogenated copolymer KH. The rate of hydrogenation of copolymer KH determined from a $^1$H-NMR spectrum was 99%. The $^1$H-NMR spectrum of copolymer KH is shown in FIG. 11. Further, the results of the solubility test of copolymer KH are shown in Table 1.

Uncrosslinked film KH-1 and crosslinked film KH-2 were prepared from copolymer KH by the same technique as with Example 10. The evaluation results of crosslinked film KH-2 are shown in Table 2.

Example 12

Figure 12:
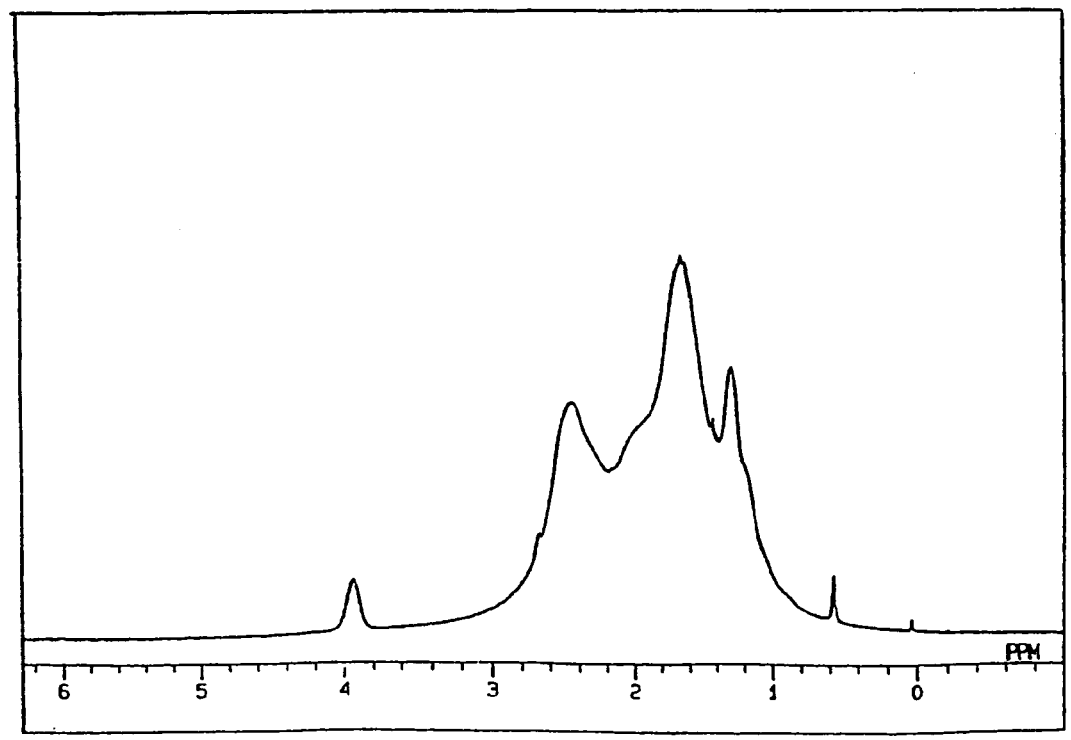
FIG. 12 is a $^1$H-NMR spectrum of a copolymer obtained in Example 12.

Operations were conducted in the same manner as with Example 4 with the exception that 700 mmol of bicyclo[2.2.1]hept-2-ene, 570 mmol of endo-tricyclo[4.3.0.1$^{2,5}$]deca-3-ene (endo/exo=96/4), 30 mmol of 5-triethoxysilylbicyclo[2.2.1]hept-2-ene and 5 mmol of 1-hexene were used as monomers, and 400 g of cyclohexane and 100 g of methylene chloride were used as solvents, thereby obtaining copolymer L at a conversion rate of 92%. The ratio of structural units derived from 5-triethoxysilylbicyclo[2.2.1]hept-2-ene in copolymer L was 2.1 mol %, and the ratio of structural units derived from endo-tricyclo[4.3.0.1$^{2,5}$]deca-3-ene was 35 mol %. The polystyrene-converted number average molecular weight of copolymer L was 89,000, the weight average molecular weight was 187,000, and Mw/Mn was 2.1. The 1H-NMR of copolymer L is shown in FIG. 12, and the results of the solubility test are shown in Table 1.

Then, using the above-mentioned copolymer L, uncrosslinked film L-1 and crosslinked film L-2 were prepared by the same operations as with Example 5. From the evaluation results of crosslinked film L-2 are shown in Table 2, the film was apparently excellent in breaking strength/breaking elongation, solvent resistance and heat deterioration resistance.

Comparative Example 4

A 2-liter reaction vessel was charged with 625 mmol of bicyclo[2.2.1]hept-2-ene, 587 mmol of endo-tricyclo[4.3.0.1$^{2,5}$]deca-3,7-diene, 37 mmol of 5-[1',4',4'-trimethyl2',6'dioxa-1'-silacyclohexyl]bicyclo[2.2.1]hept-2-ene and 5 mmol of 1-hexene as monomers, and 350 g of chlorobenzene and 285 g of cyclohexane as solvents under nitrogen.

The reaction vessel was charged with 0.40 mmol (converted to a palladium atom) of an η³-allylpalladium chloride dimer and 0.8 mmol of silver hexafluoroantimonate as catalyst components in this order, and polymerization was conducted at 30° C. for 3 hours. A white polymer started to precipitate for 10 minutes after the initiation of polymerization, and solidified in slurry form after 1 hour. The polymerization was terminated with methanol, and the precipitated polymer was separated by filtration to obtain copolymer M. The conversion rate of the monomers was 88%. The results of the solubility test of copolymer M are shown in Table 1. This copolymer M obtained by polymerization using the palladium compound as the catalyst was insoluble in toluene, cyclohexane and a mixed solvent of both.

Then, copolymer M was hydrogenated in a slurry state just like Example 2. However, hydrogenation reaction did not proceed.

Comparative Example 5

Polymerization was conducted in the same manner as with Comparative Example 4 with the exception that 950 mmol of endo-tricyclo[4.3.0.1$^{2,5}$]deca-3,7-diene, 50 mmol of 5-[1',4',4'trimethyl-2',6'dioxa-1'-silacyclohexyl]bicyclo[2.2.1]hept-2-ene and 5 mmol of 1-hexene were used as monomers, 0.4 mmol of tetrakis(acetonitrile)palladium bis(tetrafluoroborate)[Pd(CH$_3$CN)$_4$](BF$_4$)$_2$ was used as a catalyst component in place of the η³-allylpalladium chloride dimer and silver hexafluoroantimonate, and 500 g of nitromethane as a solvent. As a result, copolymer N precipitated similarly to Comparative Example 4. The conversion rate of the monomers to the copolymer was 90%.

The results of the solubility test of copolymer N are shown in Table 1. Similarly to copolymer M shown in Comparative Example 4, copolymer N was insoluble in all solvents tested, resulting in failure to prepare a film.

Comparative Example 6

Using 625 mmol of bicyclo[2.2.1]hept-2-ene, 587 mmol of exo-tricyclo[4.3.0.1$^{2,5}$]deca-3,7-diene (endo/exo=4/96) and 37 mmol of 5[1',4',4'trimethyl2',6'dioxa-1'-silacyclohexyl]bicyclo[2.2.1]hept-2-ene as monomers, polymerization was conducted under the same conditions as with Example 3 to obtain copolymer O at a conversion rate of 75%. The ratio of structural units derived from exo-tricyclo[4.3.0.1$^{2,5}$]deca3,7-diene in copolymer O was 24 mol %. Further, the ratio of structural units derived from 5-[1',4',4'-trimethyl2',6'-dioxa-1'silacyclohexyl]bicyclo[2.2.1]hept2-ene was 3.0 mol %. The polystyrene-converted number average molecular weight of copolymer O was 82,000, the weight average molecular weight was 166,000, and Mw/Mn was 2.0.

Then, hydrogenation of copolymer OH was conducted by the same operations as with Example 3 to obtain hydrogenated copolymer OH. The rate of hydrogenation determined from a ¹H-NMR spectrum of copolymer, OH was 99%. The results of the solubility test of copolymer O are shown in Table 1.

Then, using copolymer OH, uncrosslinked film OH-1 and crosslinked film OH-2 were prepared by the same technique as with Example 3. From the evaluation results of film OH-2 shown in Table 2, this copolymer in which exo-tricyclo[4.3.0.1$^{2,5}$]deca-3,7-diene having a high proportion of the exo form was used was largely inferior in physical characteristics such as breaking strength, compared to one of Example 3.

Comparative Example 7

Polymerization was conducted by the same operations as with Example 12 with the exception that 1080 mmol of endo-tricyclo[4.3.0.1$^{2,5}$]deca-3-ene (endo/exo=96/4) and 40 mmol of 5-triethoxysilylbicyclo[2.2.1]hept-2-ene were used as monomers without adding bicyclo[2.2.1]hept-2-ene. However, copolymer P precipitated during polymerization. The conversion rate of the monomers to the copolymer was 50%.

The resulting copolymer P was insoluble in all of toluene, cyclohexane and a mixed solvent thereof, so that it was unable to prepare a film. The results of the solubility test of copolymer P are shown in Table 1.

Comparative Example 8

Polymerization was conducted by the same operations as with Example 12 with the exception that 560 mmol of exo-tricyclo[(4.3.0.1$^{2,5}$]deca-3-ene (endo/exo=10/90) was used as a monomer in place of endo-tricyclo[4.3.0.1$^{2,5}$]deca-3-ene, thereby obtaining copolymer Q at a conversion rate of 97%. The ratio of structural units derived from exo-tricyclo[4.3.0.1$^{2,5}$]deca-3-ene in copolymer Q was 42 mol %, and the ratio of structural units derived from 5-triethoxysilylbicyclo[2.2.1]hept-2-ene was 3.1 mol %. Further, the polystyrene-converted number average molecular weight of copolymer Q was 119,000, the weight average molecular weight was 250,000, and Mw/Mn was 2.1. Uncrosslinked film Q-1 and crosslinked film Q-2 were prepared from the resulting copolymer Q. From the evaluation results shown in Table 2, it was apparently inferior in breaking strength/breaking elongation, compared to copolymer L of Example 12 using endo-tricyclo[4.3.0.1$^{2,5}$]deca-3-ene.

Comparative Example 9

Operations were conducted in the same manner as with Example 1 with the exception that 1,000 mmol of bicyclo[2.2.1]hept-2-ene and 2 mmol of styrene were used as monomers, thereby obtaining copolymer R at a conversion rate of 98%. The polystyrene-converted number average molecular weight of copolymer R was 195,000, the weight average molecular weight was 492,000, and Mw/Mn was 2.5. Further, the results of the solubility test of copolymer R are shown in Table 1.

Then, 10 g of copolymer R was dissolved in 35.5 g of cyclohexane, the antioxidant was added in the same manner as with Example 1, and uncrosslinked film R-1 having a thickness of 150 μm was prepared by casting. The evaluation results of film R-1 are shown in Table 1. The resulting film was weak in breaking strength and brittle, so that it was easily broken by even a small external force.

Comparative Example 10

Operations were conducted in the same manner as with Example 4 with the exception that 970 mmol of bicyclo[2.2.1]hept-2-ene and 30 mmol of 5[1',4',4'trimethyl2',6'-dioxa-1'-silacyclohexyl]bicyclo[2.2.1]hept-2-ene were used as monomers, thereby obtaining copolymer S at a conversion rate of 98%. The ratio of structural units derived from 5[1',4',4'-trimethyl2',6'dioxa-1'-silacyclohexyl]bicyclo[2.2.1]hept-2-ene in copolymer S was 2.8 mol %. The polystyreneconverted number average molecular weight of copolymer S was 116,000, the weight average molecular weight was 278,000, and Mw/Mn was 2.4. Further, the results of the solubility test of copolymer S are shown in Table 1.

Then, 10 g of copolymer S was dissolved in 35.5 g of cyclohexane, the antioxidant and the crosslinking catalyst were added in the same manner as with Example 2, and uncrosslinked film S-1 having a thickness of 150 µm and crosslinking film S-2 were prepared by a cast method. The resulting film was weak in breaking strength and brittle, so that it was easily broken by even a small external force. The evaluation results of films S-1 and S-2 are shown in Table 2.

Comparative Example 11

Operations were conducted in the same manner as with Example 2 with the exception that 1,200 mmol of bicyclo[2.2.1]hept-2-ene, 50 mmol of tricyclo[4.3.0.1$^{2,5}$]deca-3,7-diene having an endo-form ratio of 99% or more and 30 mmol of 5[1',4',4'trimethyl2',6'dioxa-1'-silacyclohexyl]bicyclo[2.2.1]hept-2-ene were used as monomers, thereby obtaining copolymer T at a conversion rate of 98%. The ratio of structural units derived from endo-tricyclo[4.3.0.1$^{2,5}$]deca-3,7-diene in copolymer T was 4 mol %, and the ratio of structural units derived from 5-[1',4',4'trimethyl]- 2',6'-dioxa-1'silacyclohexyl]bicyclo[2.2.1]hept2-ene was 2.8 mol %. The polystyreneconverted number average molecular weight of copolymer T was 120,000, the weight average molecular weight was 243,000, and Mw/Mn was 2.0.

Using the above-mentioned copolymer T, hydrogenation was conducted by the same technique as with Example 2 to obtain hydrogenated copolymer TH. The rate of hydrogenation determined from a $^1$H-NMR spectrum of copolymer TH was 99%. The results of the solubility test of copolymer TH are shown in Table 1. Subsequently, uncrosslinked film TH-1 was prepared by the same technique as with Example 2. Further, film TH-1 was crosslinked by the same technique as with Example 2 to prepare crosslinked film TH-2. The evaluation results of film TH-2 are shown in Table 2. The resulting film was brittle and broken by even a small external force, and showed low breaking strength. Like this, when the ratio of structural units derived from endo-tricyclo[4.3.0.1$^{2,5}$]deca-3,7-diene is less than 10 mol %, the film having weak braking strength is obtained.

Comparative Example 12.

Copolymer U was obtained at a conversion rate of 65% in the same manner as with. Example 2 with the exception that 625 mmol of bicyclo[2.2.1]hept-2-ene, 587 mmol of endo-tricyclo[4.3.0.1$^{2,5}$]deca-3,7-diene and 38 mmol of 5-[1',4',4'trimethyl-2',6'-dioxa-1'silacyclohexyl]bicyclo[2.2.1]hept2-ene were used as monomers, and 300 mmol of 1,3-butadiene was used in place of 1-hexene. The ratio of structural units derived from endo-tricyclo[4.3.0.1$^{2,5}$]deca-3-ene in copolymer U was 37 mol %, and the ratio of structural units derived from 5-[1',4',4'trimethyl-2',6'-dioxa1'silacyclohexyl]bicyclo[2.2.1]hept-2-ene was 2.5 mol %. The polystyreneconverted number average molecular weight of copolymer U was 8,500, the weight average molecular weight was 16,800, and Mw/Mn was 2.0.

The resulting copolymer U was hydrogenated by the same technique as with Example 2 to obtain copolymer UH at a rate of hydrogenation of 99%. The results of the solubility test of copolymer UH are shown in Table 1.

Uncrosslinked film UH-1 and crosslinked film UH-2 were prepared from copolymer UH by the same technique as with Example 2. The evaluation results of film UH-2 are shown in Table 2. This film was very brittle and easily broken by even a small external force, so that it was unable to measure many physical properties. Like this, when the number average molecular weight of the copolymer was less than 30,000, particularly 10,000 or less, only the very brittle film was obtained.

Comparative Example 13

Using the same solvent and catalyst as with Example 3, 30 g of copolymer C was hydrogenated at a hydrogen pressure of 5 MPa at 100 ° C. for 2 hours. As a result, hydrogenated copolymer VH was obtained in which the rate of hydrogenation determined from a $^1$H-NMR spectrum was 70%. The results of the solubility test of copolymer VH are shown in Table 1.

Then, using 10 g of copolymer VH, uncrosslinked film VH-1 having a thickness of 150 µm and crosslinked film VH-2 were obtained by the same technique as with Example 2. As apparent from the evaluation results of film VH-2 shown in Table 2, the copolymer low in the rate of hydrogenation resulted in the film largely inferior in heat deterioration resistance, compared to CH-2.

TABLE 1

| | | Solubility in Solvent | | | | |
|---|---|---|---|---|---|---|
| | Copolymer | Toluene | Cyclohexane | Chlorobenzene | Chlorocyclohexane | Decalin |
| Example 1 | AH | ○ | ○ | ○ | ○ | ○ |
| Example 2 | BH | ○ | ○ | ○ | ○ | ○ |
| Example 3 | CH | ○ | ○ | ○ | ○ | ○ |
| Example 4 | DH | ○ | ○ | ○ | ○ | ○ |
| Example 5 | E | ○ | ○ | ○ | ○ | ○ |
| Example 6 | FH | ○ | ○ | ○ | ○ | ○ |
| Example 7 | GH | ○ | ○ | ○ | ○ | ○ |
| Example 8 | H | ○ | ○ | ○ | ○ | ○ |
| Example 9 | I | ○ | ○ | ○ | ○ | ○ |
| Example 10 | JH | ○ | ○ | ○ | ○ | ○ |
| Example 11 | KH | ○ | ○ | ○ | ○ | ○ |
| Example 12 | L | ○ | ○ | ○ | ○ | ○ |
| Comparative Example 1 | A | | ○ | ○ | ○ | ○ |
| Comparative Example 2 | B | ○ | ○ | ○ | ○ | ○ |

TABLE 1-continued

|  | Copolymer | Solubility in Solvent | | | | |
|---|---|---|---|---|---|---|
|  |  | Toluene | Cyclohexane | Chlorobenzene | Chlorocyclohexane | Decalin |
| Comparative Example 3 | C | ○ | ○ | ○ | ○ | ○ |
| Comparative Example 4 | M | X | X | X | X | X |
| Comparative Example 5 | N | X | X | X | X | X |
| Comparative Example 6 | OH | ○ | ○ | ○ | ○ | ○ |
| Comparative Example 7 | P | X | X | X | ▲ | ▲ |
| Comparative Example 8 | Q | ○ | ○ | ○ | ○ | ○ |
| Comparative Example 9 | R | ○ | ○ | ○ | ○ | ○ |
| Comparative Example 10 | S | ○ | X | ○ | ○ | ○ |
| Comparative Example 11 | TH | ○ | ○ | ○ | ○ | ○ |
| Comparative Example 12 | UH | ○ | ○ | ○ | ○ | ○ |
| Comparative Example 13 | VH | ○ | ○ | ○ | ○ | ○ |

TABLE 2

|  | Film | Total Light Transmittance (%) | Glass Transition Temperature (° C.) | ΔYI | Coefficient of Linear Expansion (ppm/° C.) | Adhesion (Number of Peeled Blocks) | Degree of Swelling in Toluene (%) | Breaking Strength/Breaking Elongation (Mpa/%) |
|---|---|---|---|---|---|---|---|---|
| Example 1 | AH-1 | 90 | 375 | 1.8 | 56 | 10 | Dissolved | 39.2/3.8 |
| Example 2 | BH-1 | 91 | 365 | 1.7 | 54 | 0 | Dissolved | 40.6/4.0 |
|  | BH-2 | 91 | 370 | 1.9 | 51 | 0 | 180 | 51.9/6.4 |
| Example 3 | CH-1 | 91 | 380 | 2.1 | 56 | 0 | Dissolved | 29.6/3.8 |
|  | CH-2 | 90 | 380 | 2.0 | 54 | 0 | 180 | 31.8/4.5 |
| Example 4 | DH-2 | 90 | 370 | 2.3 | 55 | 0 | 190 | 32.5/4.4 |
| Example 5 | E-2 | 90 | 375 | 0.6 | 54 | 0 | 175 | 31.1/4.5 |
| Example 6 | FH-2 | 90 | 380 | 2.2 | 54 | 1 | 190 | 36.1/3.9 |
| Example 7 | GH-2 | 90 | 360 | 1.5 | 53 | 0 | 195 | 28.7/3.6 |
| Example 8 | H-1 | 90 | 350 | 0.5 | 60 | 5 | Dissolved | 40.3/4.0 |
| Example 9 | I-1 | 91 | 390 | 0.9 | 55 | 1 | Dissolved | 37.2/3.4 |
| Example 10 | JH-2 | 90 | 365 | 2.0 | 53 | 0 | 190 | 45.7/8.7 |
| Example 11 | KH-2 | 90 | 355 | 2.1 | 50 | 0 | 180 | 34.1/3.7 |
| Example 12 | L-2 | 91 | 375 | 0.6 | 50 | 1 | 180 | 49.5/6.3 |
| Comparative Example 1 | A-1 | 90 | 370 | 16 | 59 | 10 | Dissolved | 16.2/1.3 |
| Comparative Example 2 | B-2 | 90 | 360 | 17 | 57 | 0 | 180 | 16.8/1.8 |
| Comparative Example 3 | C-1 | 90 | 375 | 14 | 59 | 1 | Dissolved | 17.0/2.0 |
|  | C-2 | 48 | 380 | 18 | 58 | 15 | 270 | 19.0/2.5 |
| Comparative Example 4 | M | (Impossible to cast*) | | | | | | |
| Comparative Example 5 | N | (Impossible to cast*) | | | | | | |
| Comparative Example 6 | OH-2 | 91 | 390 | 2.0 | 48 | 0 | 220 | 16.7/1.9 |
| Comparative Example 7 | P | (Impossible to cast*) | | | | | | |
| Comparative Example 8 | Q-2 | 91 | 390 | 1.0 | 49 | 0 | 190 | 18.5/2.0 |
| Comparative Example 9 | R-1 | 90 | 350 | 0.8 | 53 | 10 | Dissolved | 20.9/1.9 |
| Comparative Example 10 | S-1 | 91 | 360 | 0.5 | 54 | 1 | Dissolved | 18.4/3.7 |
|  | S-2 | 90 | 365 | 0.6 | 50 | 0 | 210 | 19.8/3.2 |
| Comparative Example 11 | TH-2 | 90 | 365 | 1.5 | 52 | 1 | 200 | 22.0/3.1 |

TABLE 2-continued

|  | Film | Total Light Transmittance (%) | Glass Transition Temperature (° C.) | ΔYI | Coefficient of Linear Expansion (ppm/° C.) | Adhesion (Number of Peeled Blocks) | Degree of Swelling in Toluene (%) | Breaking Strength/ Breaking Elongation (Mpa/%) |
|---|---|---|---|---|---|---|---|---|
| Comparative Example 12 | UH-2 | 90 | Unmeasurable | 2.0 | Unmeasurable | 2 | 400 | Unmeasurable |
| Comparative Example 13 | VH-2 | 88 | 375 | 12 | 57 | 1 | 210 | 25.5/3.1 |

*)It was impossible to cast the polymer, because it was insoluble in toluene, cyclohexane, a mixed solvent thereof and other practical solvents.

INDUSTRIAL APPLICABILITY

According to the present invention, the material excellent in optical transparency and heat resistance, excellent in toughness and low in the coefficient of linear expansion, and therefore suitable for a film, a sheet and a thin membrane for optical material applications is obtained by the copolymer soluble in any one of toluene, cyclohexane and a mixed solvent thereof at 25° C., which is obtained by addition polymerization of the monomer containing a side chain substituent group having a ring structure and the cyclic olefin in which the ratio of the endo-form is 80% or more, using the specific nickel catalyst, and further hydrogenation as needed.

The invention claimed is:

1. A cyclic olefin addition copolymer comprising at least one repeating unit (a) selected from repeating units represented by formula (1-1),

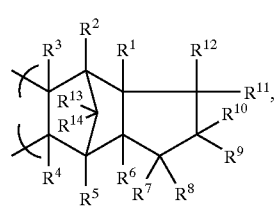

formula (1-1)

formula(1-2)

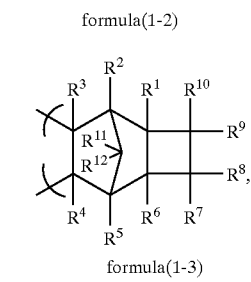

formula (1-2)

formula(1-3)

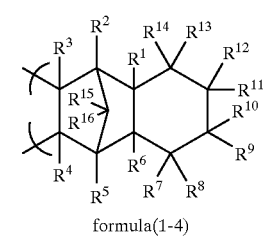

formula (1-3)

formula(1-4)

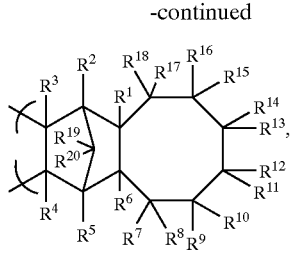

formula (1-4)

wherein $R^1$ to $R^{20}$ each independently represent a substituent group selected from the group consisting of a hydrogen atom, a halogen atom, a hydrocarbon, and a halogenated hydrocarbon group having 1 to 20 carbon atoms;

and a repeating unit (b) represented by formula (2),

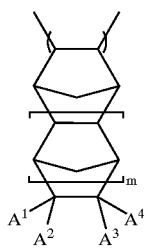

formula (2)

wherein $A^1$ to $A^4$ each independently represent a hydrogen atom, a halogen atom or a hydrocarbon or halogenated hydrocarbon group having 1 to 20 carbon atoms, and m is 0 or 1;

wherein said cyclic olefin addition copolymer is obtained by addition polymerization of a tricycloolefin compound which forms the repeating unit (a) after addition polymerization and the ratio of the endo-form (stereoisomer) of said tricycloolefin compound is 80% or more, and optionally further hydrogenating said copolymer when an olefinic unsaturated bond exists therein, said cyclic olefin addition copolymer being homogeneously soluble in any one of toluene, cyclohexane and a mixed solvent thereof at 25° C., and having a polystyrene-converted number average molecular weight ranging from 30,000 to 500,000.

2. The cyclic olefin addition copolymer according to claim 1, wherein the ratio of the endo-form (stereoisomer) in said tricycloolefin compound is 90 mol % or more.

3. The cyclic olefin addition copolymer according to claim 1, wherein the ratio (molar ratio) of the repeating units (a) to the repeating units (b), (a)/(b), is from 80/20 to 10/90.

4. The cyclic olefin addition copolymer according to claim 1, wherein said repeating unit (a) comprises said repeating unit represented by formula (1-1).

5. The cyclic olefin addition copolymer according to claim 1, wherein m=0.

6. The cyclic olefin addition copolymer according to claim 1, further comprising a repeating unit (c) represented by formula (3) in an amount of 0.1 to 30 mol % in said copolymer, wherein formula (3) is represented by:

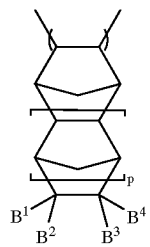

formula (3)

wherein $B^1$ to $B^4$ each independently represent a hydrogen atom, a halogen atom, a hydrocarbon or halogenated hydrocarbon group having 1 to 20 carbon atoms, a hydrolysable silyl group or a polar group represented by —$(CH_2)_kX$, and at least one of $B^1$ to $B^4$ is a hydrolysable silyl group or a substituent group selected from polar groups represented by —$(CH_2)_kX$, wherein X is —$C(O)OR^{21}$ or —$OC(O)R^{22}$, $R^{21}$ and $R^{22}$ are a substituent group selected from hydrocarbon or halogenated hydrocarbon groups having 1 to 20 carbon atoms, and k is an integer of 0 to 3; or $B^1$ to $B^4$ may be a hydrocarbon or heterocyclic ring structure formed from $B^1$ and $B^3$ or $B^2$ and $B^4$, or an alkylidenyl group formed from $B^1$ and $B^2$ or $B^3$ and $B^4$; and p represents an integer of 0 to 2.

7. The cyclic olefin addition copolymer according to claim 6, which comprises said repeating unit (c) having at least one hydrolysable silyl group.

8. The cyclic olefin addition copolymer according to claim 7, which comprises a silyl group represented by formula (4) or formula (5) as the hydrolysable silyl group, wherein said formula (4) and said formula (5) are represented by:

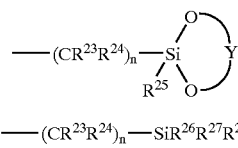

formula (4)

formula (5)

wherein $R^{23}$, $R^{24}$ and $R^{25}$ each independently represent a hydrogen atom or a substituent group selected from the group consisting of an alkyl group having 1 to 20 carbon atoms, a cycloalkyl group and an aryl group, $R^{26}$, $R^{27}$ and $R^{28}$ each independently are a hydrogen atom or a substituent group selected from the group consisting of an alkyl group having 1 to 20 carbon atoms, a cycloalkyl group, an aryl group, an alkoxyl group, an allyloxy group and a halogen atom, wherein at least one of $R^{26}$, $R^{27}$ and $R^{28}$ is a substituent group selected from the group consisting of an alkoxyl group, an allyloxy group and a halogen atom, n represents an integer of 0 to 5; and Y represents a hydrocarbon residue of an aliphatic diol having 2 to 20 carbon atoms, an aliphatic diol or an aromatic diol.

9. The cyclic olefin addition copolymer according to claim 1, further comprising a repeating unit (d) represented by formula (6):

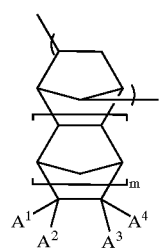

formula (6)

10. The cyclic olefin addition copolymer according to claim 1, which has a glass transition temperature of 150 to 450° C.

11. The cyclic olefin addition copolymer according to claim 1, which has a coefficient of linear expansion of 70 ppm/° C. or less.

12. A method for producing said cyclic olefin addition copolymer according to claim 1, said method comprising: polymerizing with a polymerization catalyst comprising a compound (A) or compound (B):

wherein (A) is a multicomponent catalyst comprising a nickel compound, a compound selected from the group consisting of a superacid, a Lewis acid and an ionic boron compound, and an organic aluminum compound; and (B) is a nickel compound having at least one nickel-carbon sigma bond and a superacid anion as a counter anion.

13. The method according claim 12, wherein said polymerization catalyst comprises said compound (a), and said organic aluminum compound comprises methylalumoxane.

14. A crosslinkable composition comprising said cyclic olefin addition copolymer according to claim 1, and at least one material selected from the group consisting of a radical generator, an acid generator, a catalyst for ester exchange and a polyhydric alcohol.

15. A crosslinked product obtained by forming the crosslinkable composition according to claim 14 into an article, and then, crosslinking said article.

16. An optical material comprising said cyclic olefin addition copolymer according to claim 1.

17. The optical material according to claim 16, wherein said optical material is in a membrane, a sheet or a film.

18. The optical material according to claim 17, wherein said optical material is formed by a cast method.

* * * * *